United States Patent [19]

Togawa et al.

[11] Patent Number: 6,072,174
[45] Date of Patent: Jun. 6, 2000

[54] MAGNETO-OPTICALLY MODULATING SYSTEM FOR MONITORING RELATIVE RELATIONSHIP BETWEEN AN OBJECT AND A MAGNETO-OPTIC EFFECT ELEMENT

[75] Inventors: Masayuki Togawa; Morio Kobayashi; Masahiro Kambara, all of Yokohama, Japan

[73] Assignee: Teijin Seiki Co., Ltd., Osaka, Japan

[21] Appl. No.: 09/129,229

[22] Filed: Aug. 5, 1998

[30] Foreign Application Priority Data

Aug. 8, 1997 [JP] Japan .................................... 9-214274

[51] Int. Cl.$^7$ ....................................................... G02F 1/01
[52] U.S. Cl. ......................... 250/225; 250/231.14; 385/6; 356/27
[58] Field of Search .............................. 250/225, 559.29, 250/231.14, 231.18; 385/6, 8; 324/96, 175, 244.1; 356/27, 28

[56] References Cited

U.S. PATENT DOCUMENTS

| 4,947,035 | 8/1990 | Zook et al. . |
| 5,153,512 | 10/1992 | Glasheen . |
| 5,477,376 | 12/1995 | Iwatsuka et al. ........................... 385/6 |

FOREIGN PATENT DOCUMENTS

| 0 627 613 | 12/1994 | European Pat. Off. . |
| 96/09555 | 3/1996 | WIPO . |

Primary Examiner—Que T. Le
Attorney, Agent, or Firm—Lane, Aitken & McCann

[57] ABSTRACT

A method of magneto-optically modulating light comprises the steps of linearly polarizing the light on its transmission path, and placing a magneto-optic effect element on the transmission path of the polarized light with the spontaneous magnetization direction of the magneto-optic effect element being substantially parallel with the transmission path. The plane of polarization of the polarized light is rotated about the transmission path in the absence of the magnetic field applied to the magneto-optic effect element having the polarized light pass therethrough. The method further comprises the step of applying the magnetic field to the magneto-optic effect element with its internal magnetization being oriented in a direction perpendicular to the transmission path. The plane of polarization of the polarized light is maintained in its initial state in the presence of the magnetic field applied to the magneto-optic effect element having the polarized light pass therethrough. When the object approaches the magneto-optic effect element, the applied magnetic field is modulated to have the direction of the internal magnetization of the magneto-optic effect element varied. As a result, the plane of polarization of the polarized light is rotated about the transmission path from its initial state when the polarized light passes through the magneto-optic effect element. According to the method, the light can be modulated by way of the object inoperable to apply the magnetic field to the magneto-optic effect element but capable of modulating the magnetic field of the magneto-optic effect element.

39 Claims, 18 Drawing Sheets

MAGNETO-OPTICALLY MODULATING SYSTEM FOR MONITORING RELATIVE RELATIONSHIP BETWEEN AN OBJECT AND A MAGNETO-OPTIC EFFECT ELEMENT

BACKGROUND OF THE INVENTION

1. Field of the Invention

The present invention relates to a magneto-optically modulating system, and more particularly to a method of and apparatus for magneto-optically modulating light by utilizing a magneto-optic effect element which is capable of rotating the plane of polarization of the linearly-polarized light while the polarized light passes through the magneto-optic effect element.

2. Description of the Related Art

There have so far been proposed a wide variety of magneto-optically modulating systems which can be adapted, for example, to position sensing apparatuses such as linear scales or linear/rotary encoders. A typical example of the position sensing apparatus is adapted to monitor an object, e.g., a rotary toothed gear, and generally comprises a detecting unit constituted by, for example, a Hall effect element, magneto-resistance effect element, an inductive coil type element or the like, to detect the magnetic field produced by the object which has been magnetized or is made of a magnetic substance. The position sensing apparatus thus constructed can measure the object by a relative position between the object and the apparatus, a rotational frequency of the object, the shape of the object and so forth.

One representative example of the position sensing apparatuses is shown in FIG. 21 as comprising a detecting unit constituted by the Hall effect element. In this example of the position sensing apparatus, the Hall element of the detecting unit is operated to output a signal indicative of an electric current small enough to interfere with the magnetic field. Therefore, this type of the position sensing apparatus is required to electrically amplify the signal to be produced at the highest sufficient signal-to-noise ratio (S/N). For this reason, the position sensing apparatus needs to have a large circuit to meet the above requirement.

Other than the above prior-art position sensing apparatus is proposed and shown in FIG. 22 a position sensing apparatus which comprises a detecting unit constituted by the inductive coil type element. In this example of the position sensing apparatus, the inductive coil type element can output a relatively large signal in comparison with that of the above Hall element type position sensing apparatus. This type of the position sensing apparatus, however, has a drawback in which the signal outputted from the detecting unit fails to maintain its stability because of the fact that the amplitude of the output signal is varied in accordance with the degree of modulation of the magnetic flux indicative of the magnetic field. This means the fact that, when the degree of modulation of the magnetic flux is small with the motion velocity of the toothed gear being small, the frequency of the amplitude of the outputted signal is reduced thereby causing the S/N to be extremely reduced. When, on the other hand, the motion velocity of the toothed gear becomes large, the degree of the modulation of the magnetic flux becomes large, but the output signal is induced to have an extremely high frequency to make the impedance of the inductive coil high. Therefore, it is difficult to output the signal.

Further, there has so far been proposed another position sensing apparatus of this kind, for instance, disclosed in U.S. Pat. No. 5,434,934 and developed in order to improve the above conventional position sensing apparatus. This position sensing apparatus is also adapted to modulate a polarized light and comprises a magneto-optic effect element having an internal magnetization directed to a spontaneous magnetization direction and positioned on a transmission path of the polarized light with the spontaneous magnetization direction in substantially parallel with the transmission path of the polarized light. The position sensing apparatus is operated to have the internal magnetization of the magneto-optic effect element oriented to a direction substantially perpendicular to the transmission path of the polarized light by applying a magnetic field to the magneto-optical effect element. The application of the magnetic field to the magneto-optic effect element is effected by an object. The applied magnetic field is varied in accordance with a relative positional relationship between the object and the magneto-optic effect element to have the polarized light modulated. This means that the variation of the magnetic field can be converted into an optical signal.

The prior-art position sensing apparatus, however, has encountered such a drawback that the position sensing apparatus is not available because the object to be analyzed cannot allow a magnet to be attached thereto if the object has no ferromagnetic characteristic. In order to analyze the object with this kind of the prior-art position sensing apparatus, it is necessary that a magnet be attached to the object. For instance, the position sensing apparatus is assumed to detect a rotational frequency of a toothed wheel having a rotary shaft when the toothed wheel is rotated about the rotary shaft. In this case, it is necessary for the toothed wheel to have a predetermined pattern of the magnetic field produced thereon in order to analyze a rotational frequency of the toothed wheel on the basis of the pattern of the magnetic field of the toothed wheel. When the toothed wheel is assembled with a mechanical apparatus and repeatedly operated for a period of time long enough to produce iron dust or powder worn from the mechanical parts forming part of the apparatus, the attached magnet is liable to attract the mechanically worn iron dust or powder thereby causing a trouble on the mechanical apparatus. Moreover, the toothed wheel tends to lose a balance of weight under the influence of the magnetic field of the magnet when the toothed wheel is rotated about the rotary shaft at a high speed.

SUMMARY OF THE INVENTION

It is an object of the present invention to provide a method of magneto-optically modulating light by way of an object inoperable to produce a magnetic field but capable of modulating the magnetic field. In the method, the amplitude of the output signal can maintain its stability even at an extremely reduced degree to the modulation of the magnetic flux.

It is another object of the present invention to provide a position sensing apparatus utilizing magneto-optic modulation for monitoring an object inoperable to apply a magnetic field but capable of modulating the magnetic field in the position sensing apparatus. The position sensing apparatus can measure the object by a variety of relative relationships between the object and the magneto-optic effect element. The position sensing apparatus can be reduced in size. Moreover, it is unnecessary for the position sensing apparatus to have the magnet attached thereto.

In accordance with a first aspect of the present invention, there is provided a method of magneto-optically modulating light by way of an object capable of modulating a magnetic field, comprising the steps of: (a) producing a linearly-polarized light having a plane of polarization and a transmission path having the polarized light travel thereon; and (b) preparing a magneto-optic effect element made of a magnetic substance having an internal magnetization with a predetermined spontaneous magnetization direction. The magneto-optic effect element is placed on the transmission path of the polarized light with the spontaneous magnetization direction of the magneto-optic effect element being substantially parallel with the transmission path of the polarized light. The internal magnetization of the magneto-optic effect element is oriented between two different magnetization directions consisting of a first magnetization direction in which the internal magnetization of the magneto-optic effect element is substantially parallel with the transmission path of the polarized light, and a second magnetization direction in which the internal magnetization of the magneto-optic effect element is substantially perpendicular to the transmission path of the polarized light. The internal magnetization of the magneto-optic effect element has the plane of polarization of the polarized light rotatable between two different states consisting of a first state in which the plane of polarization of the polarized light is rotated about the transmission path of the polarized light when the internal magnetization of the magneto-optic effect element is oriented to the first magnetization direction, and a second state in which the plane of polarization of the polarized light is maintained when the internal magnetization of the magneto-optic effect element is oriented to the second magnetization direction.

The aforesaid method further comprises the steps of: (c) applying a magnetic field to the magneto-optic effect element to have the internal magnetization of the magneto-optic effect element oriented to the second magnetization direction to have the plane of polarization of the polarized light substantially maintained in the second state; and (d) varying the magnetic field in accordance with a relative relationship between the object and the magneto-optic effect element to have the internal magnetization of the magneto-optic effect element varied between the first magnetization direction and the second magnetization direction to have the plane of polarization of the polarized light rotated about the transmission path between the first state and second state when the polarized light passes through the magneto-optic effect element.

In the method, the relative relationship includes a relative position between said object and said magneto-optic effect element and relative magnetic characteristics between said object and said magneto-optic effect element. In the method, the magnetic substance of the magneto-optic effect element may include a ferromagnetic substance. More preferably, the ferromagnetic substance forming magneto-optic effect element may include a ferrimagnetic substance.

In accordance with a second aspect of the present invention, there is provided a method of magneto-optically modulating light by way of an object capable of modulating a magnetic field, comprising the steps of: (a) producing a linearly-polarized light having a plane of polarization and a transmission path having the polarized light travel thereon; and (b) preparing a magneto-optic effect element made of a magnetic substance having an internal magnetization with a predetermined spontaneous magnetization direction, the magneto-optic effect element being placed on the transmission path of the polarized light with the spontaneous magnetization direction of the magneto-optic effect element being substantially perpendicular to the transmission path of the polarized light. The internal magnetization of the magneto-optic effect element is oriented between two different magnetization directions consisting of a first magnetization direction in which the internal magnetization of the magneto-optic effect element is substantially parallel with the transmission path of the polarized light, and a second magnetization direction in which the internal magnetization of the magneto-optic effect element is substantially perpendicular to the transmission path of the polarized light. The internal magnetization of the magneto-optic effect element has the plane of polarization of the polarized light rotatable between two different states consisting of a first state in which the plane of polarization of the polarized light is rotated about the transmission path of the polarized light when the internal magnetization of the magneto-optic effect element is oriented to the first magnetization direction, and a second state in which the plane of polarization of the polarized light is maintained when the internal magnetization of the magneto-optic effect element is oriented to the second magnetization direction.

The aforesaid method further comprises the steps of: (c) applying a magnetic field to the magneto-optic effect element to have the internal magnetization of the magneto-optic effect element oriented to the first magnetization direction to have the plane of polarization of the polarized light rotated about the transmission path to assume the first state; and (d) varying the magnetic field in accordance with a relative relationship between the object and the magneto-optic effect element to have the internal magnetization of the magneto-optic effect element varied between the first magnetization direction and the second magnetization direction to have the plane of polarization of the polarized light rotated about the transmission path between the first state and second state when the polarized light passes through the magneto-optic effect element.

In the method, the relative relationship includes a relative position between the object and the magneto-optic effect element and relative magnetic characteristics between the object and the magneto-optic effect element. In the method, the magnetic substance of the magneto-optic effect element may include a ferromagnetic substance. More preferably, the ferromagnetic substance forming magneto-optic effect element may include a ferrimagnetic substance.

In accordance with a third aspect of the present invention, there is provided a position sensing apparatus utilizing magneto-optic modulation for monitoring a predetermined parameter of an object capable of modulating a magnetic field. The position sensing apparatus comprises: linearly-polarized light producing means for producing a linearly-polarized light having a plane of polarization and a transmission path having the polarized light travel thereon; and a magneto-optic effect element made of a magnetic substance having an internal magnetization with a predetermined spontaneous magnetization direction. The magneto-optic effect element is placed on the transmission path of the polarized light, the internal magnetization of the magneto-optic effect element being oriented between two different magnetization directions consisting of a first magnetization direction in which the internal magnetization of the magneto-optic effect element is substantially parallel with the transmission path of the polarized light, and a second magnetization direction in which the internal magnetization of the magneto-optic effect element is substantially perpendicular to the transmission path of the polarized light. The internal magnetization of the magneto-optic effect element has the plane of polarization of the polarized light rotatable between two different states consisting of a first state in which the plane of polarization of the polarized light is rotated about the transmission path of the polarized light at a predetermined rotational angle when the internal magnetization of the magneto-optic effect element is oriented to the first magnetization direction, and a second state in which the plane of polarization of the polarized light is maintained when the internal magnetization of the magneto-optic effect element is oriented to the second magnetization direction.

The aforesaid position sensing apparatus further comprises: magnetic field applying means for applying a magnetic field to the magneto-optic effect element; and analyzing means for analyzing the polarized light after passing through the magneto-optic effect element to detect a relative relationship between the object and the magneto-optic effect element.

In the position sensing apparatus, the magneto-optic effect element may be placed on the transmission path of the polarized light with the spontaneous magnetization direction of the magneto-optic effect element being substantially parallel with the transmission path of the polarized light. The magnetic applying means is operated to apply the magnetic field to the magneto-optic effect element to have the internal magnetization of the magneto-optic effect element oriented to the second magnetization direction to have the plane of polarization of the polarized light in the first state.

In the aforesaid position sensing apparatus, the magneto-optic effect element may be placed on the transmission path of the polarized light with the spontaneous magnetization direction of the magneto-optic effect element being substantially perpendicular to the transmission path of the polarized light. The magnetic applying means applying the magnetic field to the magneto-optic effect element to have the internal magnetization of the magneto-optic effect element oriented to the first magnetization direction to have the plane of polarization of the polarized light rotated about the transmission path at the rotational angle in the first state.

In the aforesaid position sensing apparatus, the relative relationship may include a relative position between the object and the magneto-optic effect element and relative magnetic characteristics between the object and the magneto-optic effect element. In the position sensing apparatus, the magnetic substance of the magneto-optic effect element may include a ferromagnetic substance. Furthermore, the ferromagnetic substance forming magneto-optic effect element may include a ferrimagnetic substance.

In the position sensing apparatus, the magnetic field applying means may be constituted by a magnetic generator for applying a magnetic field directed to a predetermined direction. The directions of the magnetic fields of the magnetic generator are substantially parallel and identical with each other and substantially perpendicular to the transmission path of the polarized light.

In the aforesaid position sensing apparatus, the magnetic field applying means may be constituted by at least two magnetic generators positioned across the magneto-optic effect element and applying a magnetic field directed to a predetermined direction. The directions of the magnetic field of the magnetic generators are substantially parallel and identical with each other and substantially perpendicular to the transmission path of the polarized light.

In the aforesaid position sensing apparatus, each of the magnetic generators has a direction of magnetization. The directions of magnetization of the magnetic generators are substantially perpendicular to each other and identical to each other. The directions of magnetization of the magnetic generators are substantially parallel with each other and identical to each other. The directions of magnetization of the magnetic generators are substantially perpendicular to each other and opposite to each other.

In the position sensing apparatus, the object may be placed on a line extended from the transmission path of the polarized light and spaced apart from the magneto-optic effect element at a predetermined distance to modulate the magnetic field applied by the magnetic field applying means.

In the position sensing apparatus, the object may have a plane board and a rotary shaft about which the plane board of the object is rotated. The rotary shaft is substantially perpendicular to the transmission path of the polarized light, and has a plurality of magnetic portions on its peripheral portion. The analyzing means is operated to detect the rotation of the object on the basis of the applied magnetic field varied in response to the rotation of the object when the object is rotated about the rotary shaft.

In the position sensing apparatus, the rotation of the object may be analyzed by the analyzing means to obtain a rotational frequency, an angular velocity, or an angular acceleration. In the aforesaid position sensing apparatus, the analyzing means may be operable to detect an eccentric displacement of the rotary shaft of the object eccentrically displaced from its original position. In the aforesaid position sensing apparatus, the object may have a shaft bearing. The analyzing means may be operable to judge whether the shaft bearing is worn or not on the basis of the detected eccentric displacement of the rotary shaft of the object.

In the position sensing apparatus, the object may have a plane board and a rotary shaft about which the plane board of the object is rotated. The plane board may have a curved surface portion on its peripheral portion. The rotary shaft may be substantially perpendicular to the transmission path of the polarized light. The analyzing means may be operated to detect the rotation of the object on the basis of the applied magnetic field varied in response to the rotation of the object when the object is rotated about the rotary shaft.

In the aforesaid position sensing apparatus, the rotation of the object may be analyzed by the analyzing means to obtain a rotational frequency, an angular velocity, or an angular acceleration. The analyzing means may be operable to detect an eccentric displacement of the rotary shaft of the object eccentrically displaced from its original position. The object may have a shaft bearing. The analyzing means may be operable to judge whether the shaft bearing is worn or not on the basis of the detected eccentric displacement of the rotary shaft of the object.

The position sensing apparatus may further comprise motion converting means for converting the rotary motion of the object into a rectilinear motion. The motion converting means has a magnetic portion capable of modulating the magnetic field of the magneto-optic effect element faced to and moved with respect to the magneto-optic effect element. The analyzing means may be detect the rectilinear motion of the magnetic portion of the motion converting means to analyze the rotary motion of the object.

In the position sensing apparatus, the object may have a curved surface portion faced to the magneto-optic effect element and movable along a line perpendicular to the transmission path of the polarized light. The analyzing means may be operated to analyze the movement of the object.

The object may have at least one magnetic portion capable of modulating the magnetic field of the magneto-optic effect element and moved with respect to the magneto-optic effect element. The analyzing means may be operated to analyze the movement of the object.

The object may have a surface faced to the magneto-optic effect element and movable with respect to the magneto-optic effect element and a plurality of magnetic portions arranged on the surface and spaced apart from each other. Furthermore, the surface may have a curved surface. The surface may have a flat surface.

In the position sensing apparatus, the linearly-polarized light producing means may be constituted by a light source for emitting a light having a plurality of the planes of polarization and a polarizer for linearly polarizing the light emitted from the light source to produce a linearly-polarized light having a plane of polarization of the light polarized into the first state. The aforesaid apparatus further comprises: a first optical wave guiding means for guiding the light emitted from the light source on the transmission path of the light and transmitting the polarized light from the light source to the magneto-optic effect element through the polarizer; reflecting means for reflecting the light which penetrates through the magneto-optic effect element to have the polarized light travel in the opposite direction on the transmission path through the magneto-optic effect element; and a second optical wave guiding means for guiding the light reflected by the reflecting means from the magneto-optic effect element to the analyzing means through the polarizer.

In the aforesaid position sensing apparatus, the rotational angle of the plane of polarization of the polarized light may be 45 degrees when the polarized light passes through the magneto-optic effect element and the internal magnetization of the magneto-optic effect element is directed to the first magnetization direction.

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENTS

Referring now to FIGS. 1 to 9 of the drawings, there is shown a first preferred embodiment of the magneto-optically modulating apparatus according to the present invention which will be described hereinlater. The magneto-optically modulating apparatus is designed to magneto-optically modulate by way of an object capable of modulating a magnetic field and inoperable to produce a magnetic field.

Figure 1:
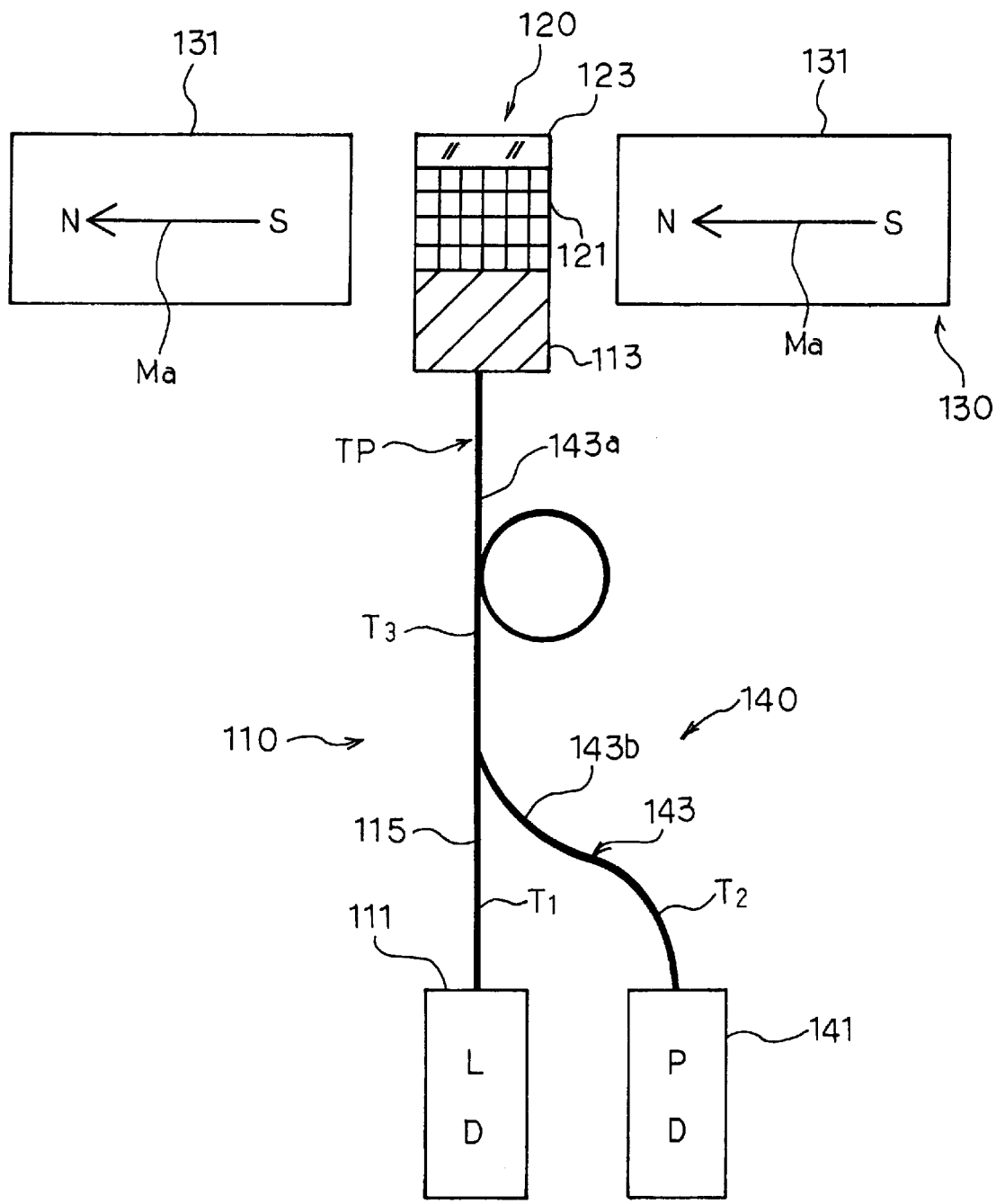
FIG. 1 is a block diagram showing a first preferred embodiment of the magneto-optically modulating apparatus according to the present invention.

As best shown in FIG. 1, the magneto-optically modulating apparatus comprises linearly-polarized light producing means 110 for producing a linearly-polarized light having a plane of polarization and a transmission path TP having the polarized light travel thereon, a sensing probe 120 for sensing a variation of a relative relationship between the object (not shown in FIG. 1) and the sensing probe 120, magnetic field applying means 130 for applying a magnetic field to the sensing probe 120, and optically analyzing means 140 for optically analyzing the modulated light.

The linearly-polarized light producing means 110 is constituted by a light source, e.g., a semiconductor laser 111 and a polarizer 113. The semiconductor laser 111 is adapted to produce laser light having a plurality of planes of polarization each defined by an electric vector and the propagation direction of the laser light. The electric vector of each of the planes of polarization of the light consists of first and second light components. The first light component is directed in perpendicular to the second light component. The semiconductor laser 111 may be replaced with another light source, such as an LED, a halogen lamp, a gas laser or the like, as long as the light source can emit a light with a desired intensity.

The polarizer 113 is designed to linearly polarize the light emitted from the semiconductor laser 111. The polarizer 113 is operated to select a predetermined plane of polarization from among the plurality of planes of polarization of the laser light when the polarizer 113 allows the laser light to pass therethrough. The polarized light has an electric vector at a point on the transmission path TP oriented with respect to the propagation direction of the laser light in a specific direction according to the polarizer 113. The plane of polarization of the polarized light is defined by the electric vector and the propagation direction of the laser light. The electric vector of the plane of the polarized light only consists of the first light component. This means that the polarizer 113 is operable to select a single light component from among the first and second light components of the light so that the selected light component of the light can be polarized when the light passes through the polarizer 113.

The polarized light producing means 110 further comprises a first optical fiber 115 connected at one end to the semiconductor laser 111 and at the other end to the sensing probe 120 through the polarizer 113 to guide the laser light emitted from the semiconductor laser 111 to the sensing probe 120. The aforesaid first optical fiber 115 forms optical wave guiding means for guiding the light emitted from the light source on the transmission path TP of the laser light emitted from the semiconductor laser 111.

The sensing probe 120 is constituted by a magneto-optic effect element 121 having one end portion held in contact with the polarizer 113, and a reflecting mirror 123 connected to the other end portion of the magneto-optic effect element 121. The magneto-optic effect element 121 may be made of a transparent ferromagnetic substance, for example, a ferrimagnetic substance, such as a magnetic single-crystal Yttrium iron garnet which is so-called "magnetically soft" by those skilled in the art. The magneto-optic effect element 121 will become apparent as the description proceeds. The reflecting mirror 123 is operated to reflect the polarized light transmitted from the magneto-optic effect element 121. The reflecting mirror 123 may be constituted by a metallic mirror or dielectric film mirror. The reflected light is returned to the magneto-optic effect element 123 to pass therethrough. The planes of polarization of the lights are invariable before and after the light is reflected.

The aforesaid reflecting mirror 123 may be constituted by a reflecting prism. The reflecting mirror 123 may be a U-shaped wave guiding element constituted by an optical fiber, a thin film wave guide or the like. The aforesaid reflecting mirror 123 can be formed to attain, for example, total reflection by the reflecting surface of each of reflecting face portions between air and glass.

Figure 2:
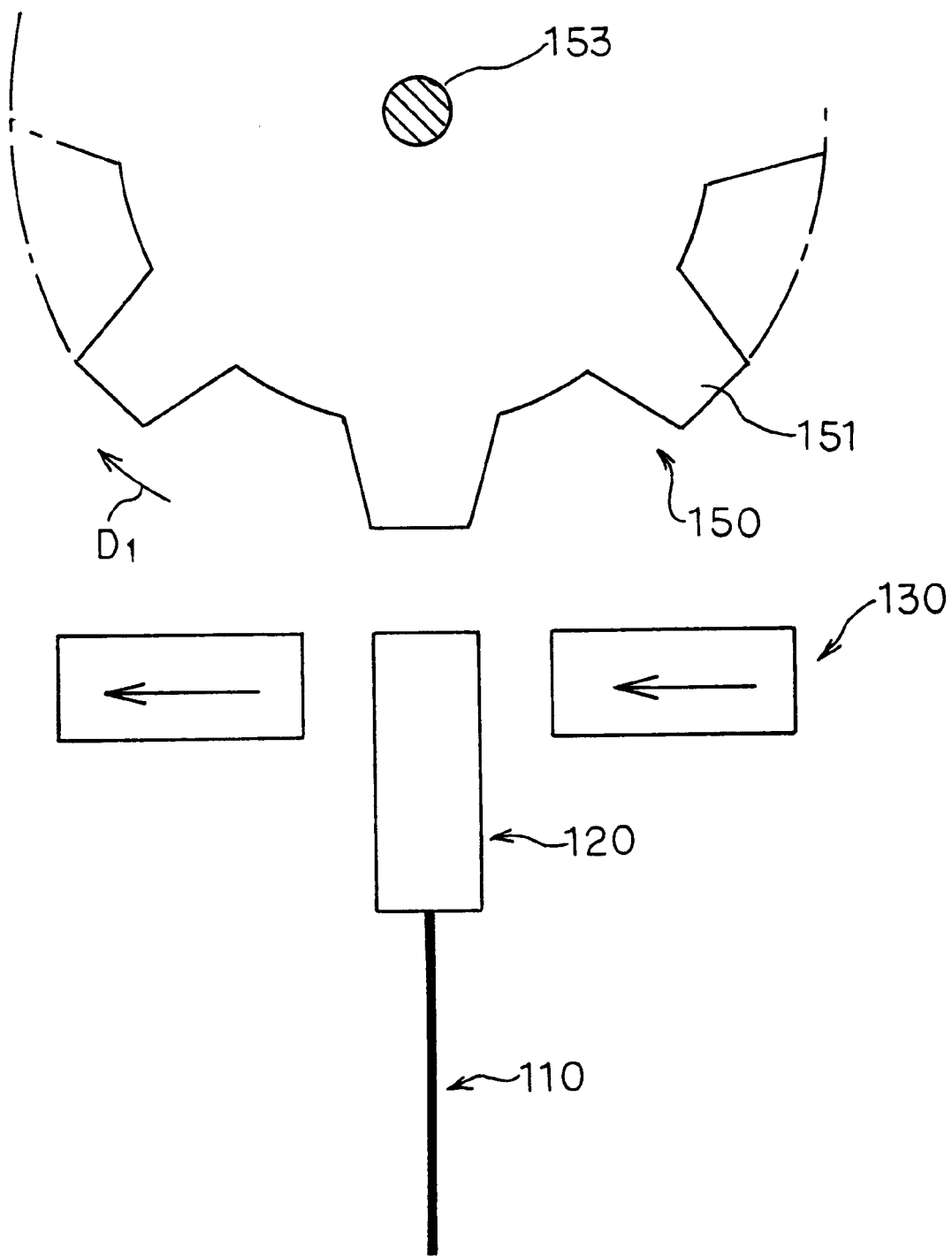
FIG. 2 is a schematic view showing the magneto-optically modulating apparatus shown in FIG. 1 and utilized as a position sensing apparatus for monitoring a rotary gear in rotary motion.

The magneto-optically modulating apparatus shown in FIG. 1 can be utilized as a position sensing apparatus. In this position sensing apparatus, the sensing probe 120 is placed close to an object 150, such as a rotary toothed gear 151, to be monitored, as shown in FIG. 2. The object 150 may be made of a magnetic substance inoperable to produce a magnetic field but capable of modulating a magnetic field. The position sensing apparatus is operable to sense a variation of the magnetic field modulated by the object 150 to measure a relative position between the object 150 and the sensing probe 120 on the basis of the sensed variation of the magnetic field. When the rotary toothed gear 151 is rotated about the axis of its rotary shaft 153 in a rotational direction shown by an arrow $D_1$ in FIG. 2, the position sensing apparatus is operated to measure the rotary toothed gear 151 by a rotational frequency, an angular velocity, or an angular acceleration.

Returning to FIG. 1 of the drawings, the magnetic field applying means 130 comprises a pair of permanent magnets 131 positioned across the magneto-optic effect element 121 of the sensing probe 120. The magnetic field applying means 130 may be constituted by at least two magnets 131. Each of the magnets 131 of the magnetic field applying means 130 has a magnetization defined by a magnetization vector represented by an arrow Ma. The magnetic field applying means thus constructed can produce a magnetic field to be applied to the magneto-optic effect element 121 of the sensing probe 120. The magnetic field is produced in proportion to the internal magnetizations Ma of the magnets 131. The lines of magnetic force in the bundles of the applied magnetic field are substantially parallel with each other and directed from one of the magnets 131 toward the other of the magnets 131 with the directions of these lines of magnetic force in substantially perpendicular relationship to the transmission path TP of the polarized light. The permanent magnets 131 may be collectively formed into a disk shape having the magneto-optic effect element 121 encircled thereby. The magnetic field applying means 130 may be constituted by a solenoid coil for generating a magnetic field to be applied to the magneto-optic effect element 121. The magnetic field can be regulated in accordance with an electric current which passes through the solenoid coil.

The optically analyzing means 140 is adapted to analyze the first and second light components to select a single light component from the first and second light components as an optical signal, and to convert the optical signal into an electric signal. The optically analyzing means 140 is also constituted by the polarizer 113 of the polarized light producing means 110. In this embodiment, the polarizer 113 of the polarized light producing means 110 serves to allow only one of the first and second light components of the polarized light to be selected when the polarized light passes through the polarizer 113. The optically analyzing means 140 further comprises a photo diode 141 for converting the optical signal received from the sensing probe 120 into an electric signal, and a second optical fiber 143 connected at one end to the polarizer 113 and at the other end to the photo diode 141 to guide the polarized light from the polarizer 113 to the photo diode 141 on its transmission path $T_2$.

It should be noted that the second optical fiber 143 constitutes second optical wave guiding means and partly has a common fiber portion 143a constituted by a part of the first optical fiber 115 and a branch portion 143b connected to the common fiber portion 143a through a fiber coupler not shown, such as a fiber type optical coupler, a bulk type optical coupler, a beam splitter or the like. The optical transmission paths $T_1$, $T_2$ formed by the first and second optical fibers 115, 143 partly share a unitary optical transmission path $T_3$ within the common potion 143a of the second optical fiber 143. The aforesaid first optical fiber 115 and the polarizer 113 form as a whole a first optical wave transmitting unit for transmitting the polarized light from the polarized light producing means 110 to the other end portion of the magneto-optic effect element 121. The aforesaid polarizer 113 and the second optical fiber 143 form as a whole a second optical wave transmitting unit for transmitting the selected one of the first and second light components from the other end portion of the magneto-optic effect element 121 to the photo diode 141.

As the first and second optical wave transmitting units are connected to the one end portion of the magneto-optic effect element 121, the polarized light producing means 110 and the photo-electric converting means are arranged adjacent to each other. Further, the optical transmission paths $T_1$, $T_2$ formed by the first and second optical fibers 115, 143 partly share a unitary optical transmission path $T_3$, and the analyzing element is constituted by the polarizer 113. Accordingly, the magneto-optically modulating apparatus can be reduced in size and structurally simple. Furthermore, in the case of extension of the first and second optical fibers 115, 143, the long common portion 143a can be constituted by part of the first optical fiber 115. This results in the fact that the cost of the magneto-optically modulating apparatus can be reduced.

Figure 3:
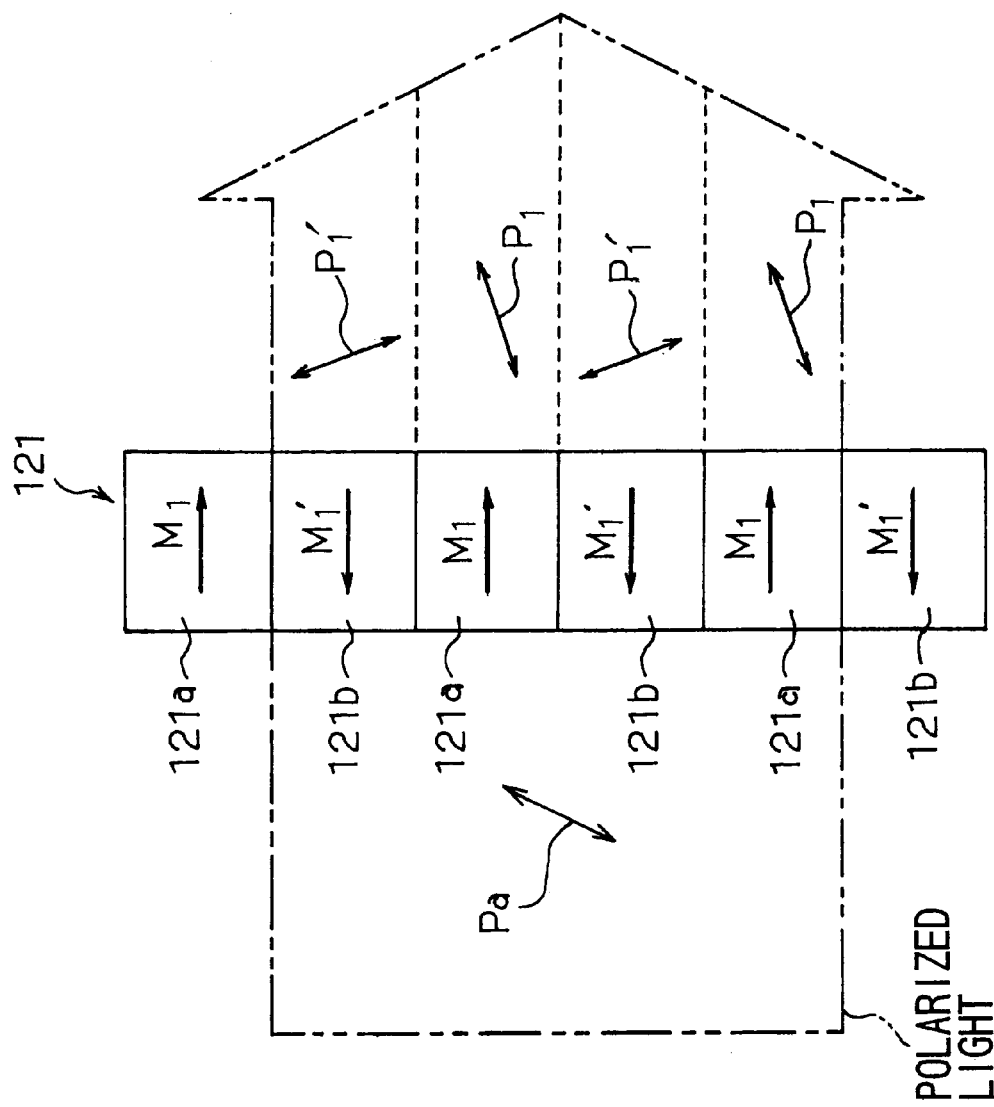
FIGS. 3 and 4 are schematic views showing different magnetizing behaviors of the magneto-optic effect element shown in FIG. 1.

The detailed description of the magneto-optic effect element 121 will be made hereinlater with reference to FIGS. 3 and 4 of the drawings. The magneto-optic effect element 121 is composed of an assemblage of spontaneously magnetized regions, i.e., magnetic domains 121a, 121b each spontaneously magnetized to have a spontaneous magnetization direction. For simplicity and better understanding, the schematic representation of FIG. 3 shows only three pairs of adjacent magnetic domains 121a, 121b having respective first magnetization directions shown by parallel arrows $M_1$ and $M_1'$ opposite to each other. The substantially transparent ferromagnetic substance of the magneto-optic effect element 121 has a quiescent maze pattern of magnetic domains 121a, 121b on a section perpendicular to the transmission path TP of the polarized light. When, on the other hand, the magnetic field is represented by an arrow Ha and applied to the magneto-optic effect element 121, the internal magnetization of the magneto-optic effect element 121 is oriented to have a second magnetization direction substantially perpendicular to transmission path TP of the polarized light as shown by the plurality of arrows $M_2$ in FIG. 4.

The light linearly polarized by the polarizer 113 has an electric vector shown, for instance, by an arrow Pa at a point on the transmission path TP and oriented with respect to the propagation direction of the laser light in a specific direction according to the polarizer 113. The polarized light, therefore, has a plane of polarization defined by the electric vector and the propagation direction of the laser light. In this embodiment, the state of plane of polarization of the light is represented by the electric vector.

As shown in FIG. 3, the magneto-optic effect element 121 is placed on the transmission path TP of the polarized light with the first magnetization directions $M_1$ and $M_1'$ of the magneto-optic effect element 121 being substantially parallel with the transmission path TP of the polarized light. When the plane of polarization of the polarized light passes through the magneto-optic effect element 121 in the absence of the applied magnetic field, the internal magnetization of the magneto-optic effect element 121 directed in the first magnetization direction $M_1$ or $M_1'$ allows the plane of polarization of the polarized light to rotate about the transmission path TP from the initial state Pa to assume a first state. The first state is shown by a plurality of oblique arrows $P_1$ or $P_1'$ in FIG. 3 each having one of two different rotational directions to distinguish the rotational directions of the planes of polarization of polarized light beams respectively passing through the adjacent domains 121a, 121b of the magneto-optic effect element 121.

Figure 4:
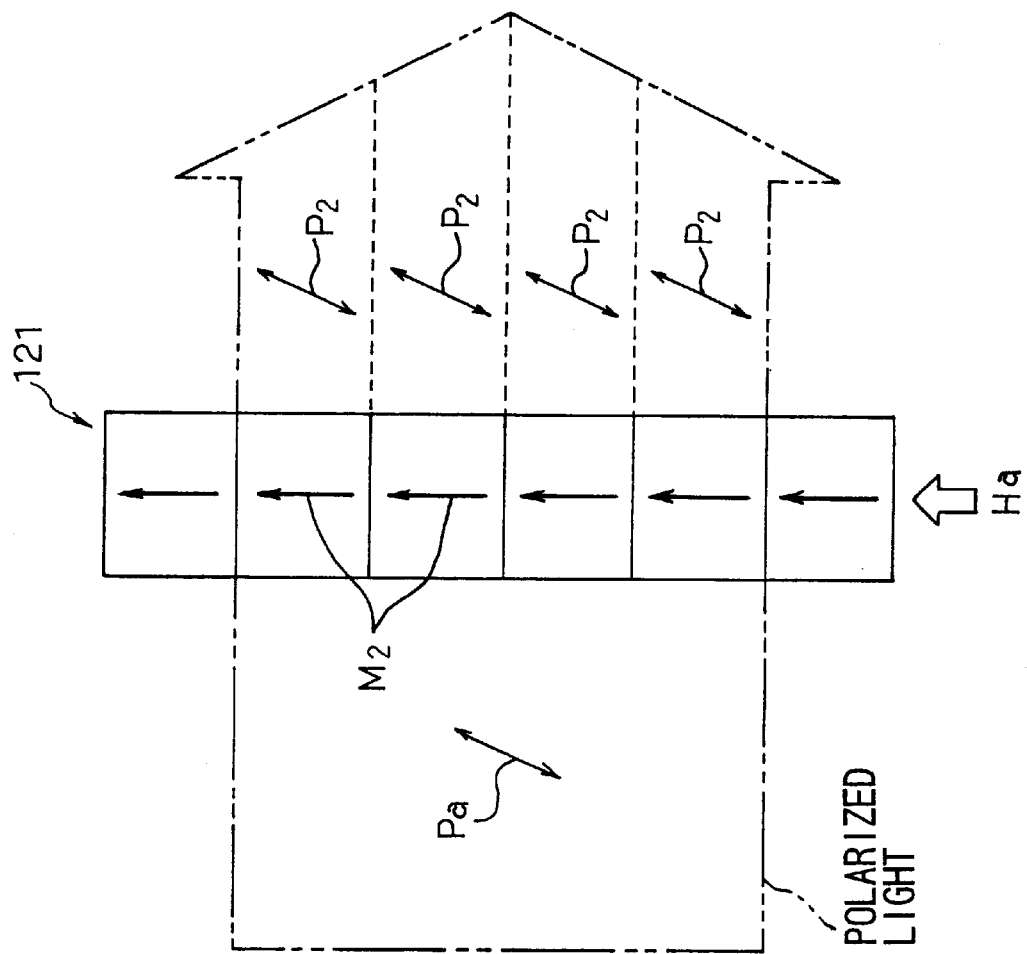

When, on the other hand, the magneto-optic effect element 121 is magnetized to have the second magnetization direction $M_2$ substantially perpendicular to the transmission path TP of the polarized light, the plane of polarization of the polarized light is substantially maintained at the initial state Pa to assume a second state $P_2$ as shown in FIG. 4. The second state $P_2$ is substantially identical to the initial state Pa.

In case where the magnetic field Ha is applied to the magneto-optic effect element 121, the magneto-optic effect element 121 becomes birefringent and the transverse magneto-optic birefrengence, viz., the Voigt effect is observed within the magneto-optic effect element 121. The direction of the magnetic field Ha, the direction of the electric vector of the incident polarized light and a crystallization direction of the magneto-optic effect element 121 are so determined as to reduce the function of the magneto-optic effect element 121 to elliptically polarize the incident light for the Voigt effect also called the Cotton-Mouton effect and to rotate the major axis of the elliptically polarized light for the Voigt effect.

As will be understood from FIG. 3, the plane of polarization of the polarized light is rotated by a specific rotational angle, for example, 45 degrees to assume the first state $P_1$ or $P_1'$ while the polarized light passes through the magneto-optic effect element 121 in the absence of the applied magnetic field Ha. This rotation of the plane of polarization is also called a Faraday rotation. More particularly, as shown in FIG. 3, each of the magnetic domains 121a, 121b of the magneto-optic effect element 121 causes the Faraday rotation at the specific rotational angle in the absence of the magnetic field Ha applied to the magneto-optic effect element 121 by the permanent magnets 131.

In other words, the plane of polarization of the polarized light is optically rotated due to the Faraday effect on condition that each of the magnetic domains 121a, 121b of the magneto-optic effect element 121 is spontaneously magnetized in the substantially parallel with the transmission path TP of the polarized light in the absent of the magnetic field Ha applied by the permanent magnets 131.

The rotational angle of the plane of polarization of the polarized light is reduced, for example, minimized by the magneto-optic effect element 121 under the influence of the magnetic field Ha applied by the magnetic field applying means 130. As a consequence, the plane of polarization of the polarized light is shifted from the first state $P_1$ or $P_1'$ to the second state $P_2$ substantially identical to the initial state Pa of the polarized light. More particularly, as shown in FIG. 4, the plane of polarization of the polarized light is substantially maintained at the initial state Pa of the polarized light while the polarized light passes through the magnetic domains 121a, 121b of the magneto-optic effect element 121 under the influence of the magnetic field Ha, since the rotational angle of the plane of polarization of the polarized light is reduced by the magneto-optic effect element 121 to allow the plane of polarization to assume the second state $P_2$. Thus, the polarized light is modulated to have a first light component when the plane of polarization is rotated to the first state $P_1$ or $P_1'$, on the contrary, the polarized light is modulated to have a second light component when the plane of polarization is rotated to the second state $P_2$.

The operational principles of the magneto-optically modulating apparatus thus constructed and mentioned above, more particularly, of Faraday rotation in the magneto-optic effect element will hereinafter be described in detail with reference to FIGS. 5 to 7 of the drawings.

Figure 5:
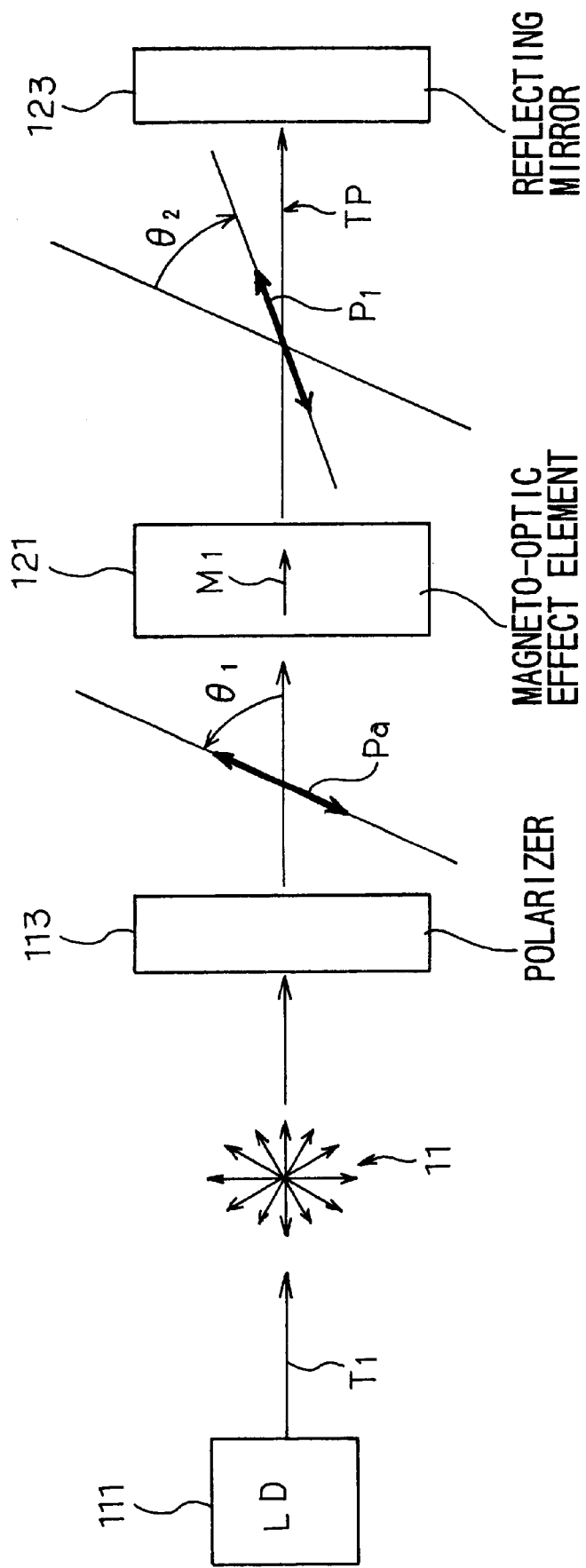
FIGS. 5 to 7 are schematic views for explaining the operational principle of the magneto-optically modulating apparatus illustrated in FIG. 1.
Figure 6:
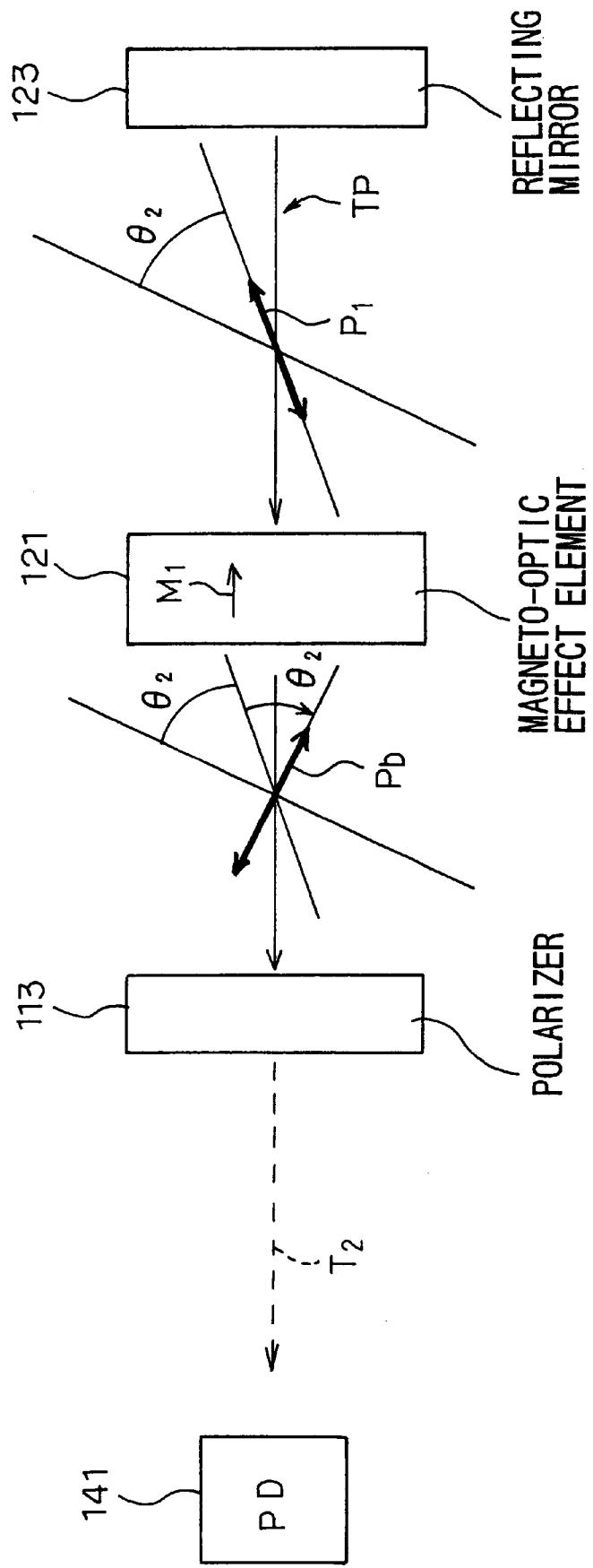

Firstly, as shown in FIGS. 5 and 6, the magnetic field Ha is inhibited from being applied to the magneto-optic effect element 121. The polarized light, therefore, passes through the magneto-optic effect element 121 in the absence of the applied magnetic field Ha. In this case, the laser light emitted from the semiconductor laser 11 is transmitted to the one end portion of the polarizer 113 through the first optical fiber 115. The laser light 11 is then linearly polarized to have a plane of polarization angled at a first rotational angle $\theta_1$ with respect to the transmission path PT to assume the initial state Pa while the laser light 11 passes through the polarizer 113 as shown in FIG. 5. The polarized light passing through the polarizer 113 is then incident upon the one end portion of the magneto-optic effect element 121.

Within the magneto-optic effect element 121, the plane of polarization of the polarized light is rotated about the transmission path TP of the polarized light by the magneto-optic effect element 121 to assume the first state $P_1$ and angled at a second rotational angle $\theta_2$ from the initial state Pa to the first state $P_1$ while the magneto-optic effect element 121 is uninfluenced by the applied magnetic field Ha and has the spontaneous magnetization substantially parallel with the transmission path of the polarized light. This means that the plane of polarization of the polarized light can be rotated due to the Faraday effect on condition that the polarized light passes through the magneto-optic effect element 121 in the direction substantially parallel with the spontaneous magnetization of the magneto-optic effect element 121.

The light passing through the magneto-optic effect element 121 is then reflected by the reflecting mirror 123. The plane of polarization of the reflected light is substantially maintained at the first state $P_1$ as shown in FIG. 6. When the reflected light passes through the magneto-optic effect element 121, the plane of polarization of the light is also rotated about the transmission path TP to assume a final state Pb and angled at the second angle $\theta_2$ between the first state $P_1$ and the final state Pb.

In this embodiment, the second rotational angle $\theta_2$ may be, but not limited to, 45 degrees. Therefore, the plane of polarization of the light at the final state Pb is angled at a right angle between the initial state Pa and the final state Pb. This means that the plane of polarization of the polarized light is rotated by a right angle to assume the final state Pb while the polarized light passes through the magneto-optic effect element 121 in the absence of the applied magnetic field Ha. This leads to the fact that the plane of polarization of the light at the final state Pb has the only second light component while the plane of the polarization of the light at the initial state Pa has the only first light component substantially perpendicular with the second light component as described above. The second light component is impossible to pass through the polarizer 113. Therefore, it is impossible to transmit the light which passes through the sensing probe 120 from the polarizer 113 to the photo diode 141, and to detect this light in the photo diode 141.

Figure 7:
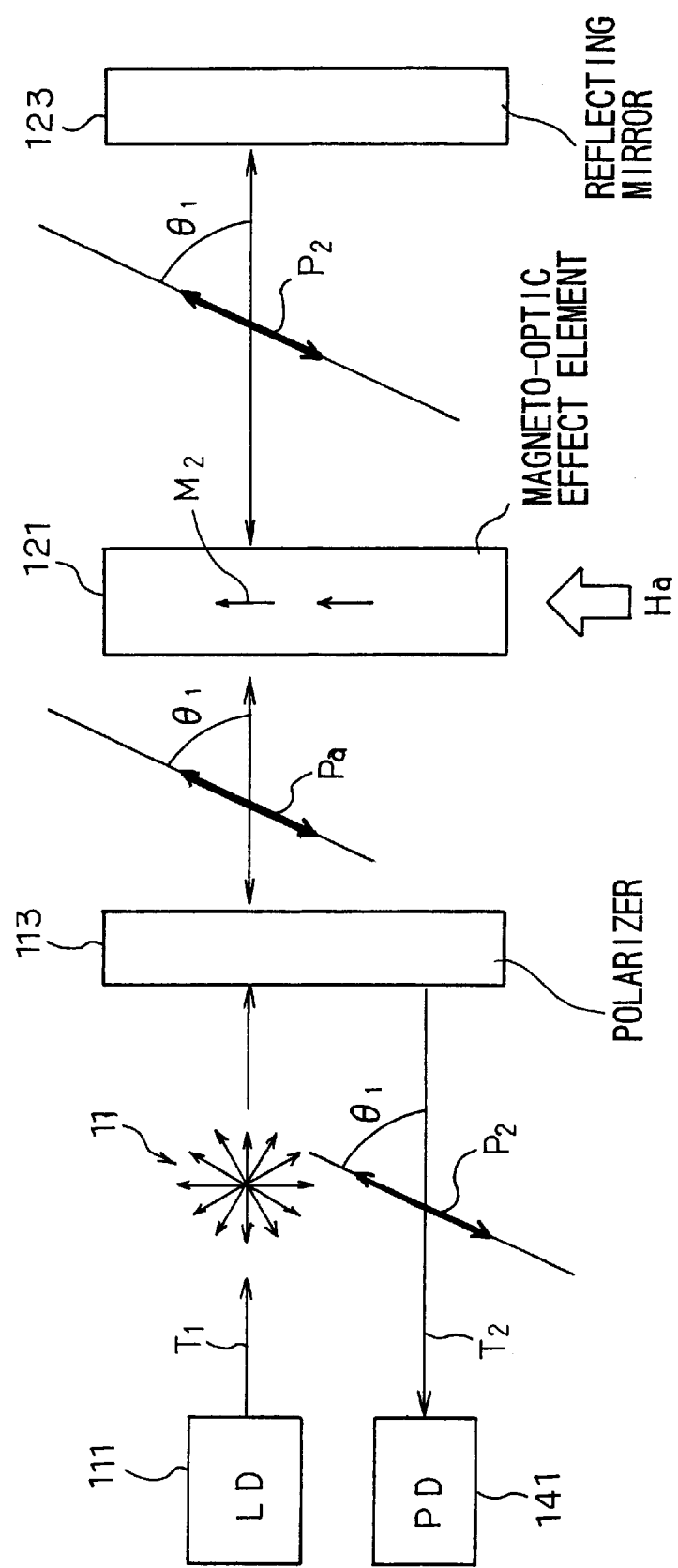

Secondly, the magnetic field Ha is applied to the magneto-optic effect element 121 as shown in FIG. 7. The laser light 11 emitted from the semiconductor laser 111 is transmitted to the one end portion of the polarizer 113 through the first optical fiber 115. The laser light 11 is then linearly polarized to have the plane of polarization angled at the first rotational angle $\theta_1$ with respect to the transmission path TP to assume the initial state Pa while the laser light passes through the polarizer 113. The polarized light passing through the polarizer 113 is then incident upon the one end portion of the magneto-optic effect element 121 in the presence of the applied magnetic field Ha.

The plane of polarization of the polarized light is substantially maintained at the second state $P_2$ substantially identical to the initial state Pa of the polarized light while the magneto-optic effect element 121 is influenced by the applied magnetic field Ha and has the internal magnetization oriented in the second magnetization direction $M_2$ substantially perpendicular to the transmission path TP of the polarized light.

The light passing through the magneto-optic effect element 121 is then reflected by the reflecting mirror 123. The plane of polarization of the reflected light is also substantially maintained at the second state $P_2$. When the reflected light passes through the magneto-optic effect element 121, the plane of polarization of the light substantially maintained at the second state $P_2$ and substantially identical to the initial state Pa of the polarized light. Consequently, the polarized light at the second state $P_2$ has the only first light component. The light is transmitted from the sensing probe 120 to the photo diode 141 through the polarizer 113.

Description will be made hereinlater on how the above magneto-optically modulating apparatus can modulate the light by way of an object capable of modulating the magnetic field, but inoperable to apply the magnetic field to the magneto-optic effect element 121.

Figure 8:
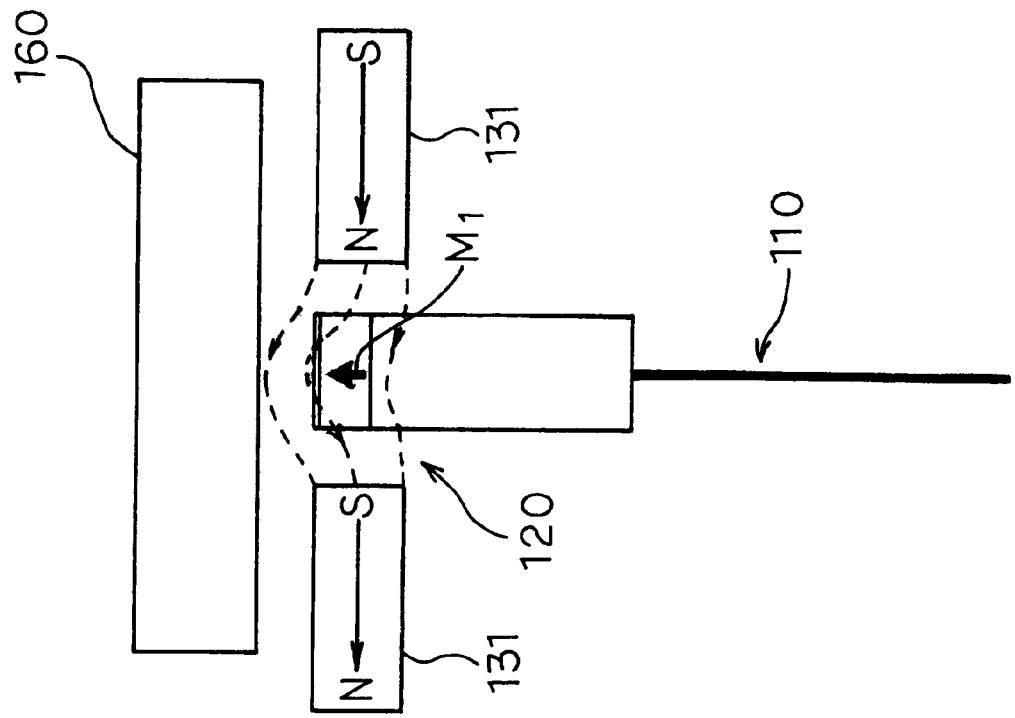
FIGS. 8 and 9 are diagrammatic illustrations of a relative relationship between the sensing probe and the object to be monitored by the magneto-optically modulating apparatus shown in FIG. 1.
Figure 9:
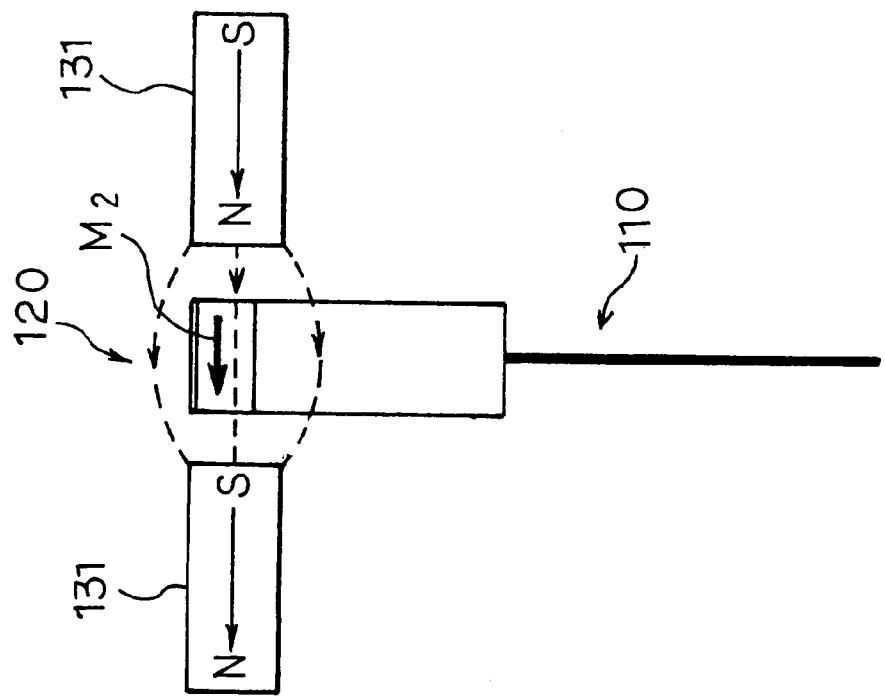

Referring to FIGS. 8 and 9 of the drawings, there are illustrated a relative relationship between the magneto-optically modulating apparatus and an object 160. The object 160 may be made of a carbon steel. As shown in FIG. 8, the magneto-optically modulating apparatus has a magnetic field around the sensing probe 120 applied by the pair of magnets 131 and uninfluenced by the object 160. The applied magnetic field has a magnetic flux represented by broken lines and substantially perpendicular to the transmission path TP of the polarized light which passes through the magneto-optic effect element 121 of the sensing probe 120. On the other hand, as shown in FIG. 9, the magneto-optically modulating apparatus has a magnetic field around the sensing probe 120 applied by the pair of magnets 131 and influenced by the object 160. As a result, the applied magnetic field is modulated to have the magnetic flux of the applied magnetic field oriented toward the object 160.

When the object is moved to a position far away from the magneto-optic effect element 121 as shown in FIG. 8, the magnetic field is applied to the magneto-optic effect element 121 to have the internal magnetization directed to the second magnetization direction $M_2$. Therefore, the plane of polarization of the polarized light is substantially maintained at the initial state Pa to assume the second state $P_2$ as described above. The light at the second state $P_2$ is composed of the only first light component. Therefore, the polarizer 113 can transmit the light from the sensing probe 120 to the photo diode 141 therethrough.

When, on the other hand, the object 160 is moved to a position adjacent to the sensing probe 120 enough to orient the internal magnetization of the magneto-optic effect element 121 in the first magnetization direction $M_1$ substantially parallel with the transmission path TP of the polarized light as shown in FIG. 9, the rotational angle of the plane of polarization of the polarized light is increased by the magneto-optic effect element 121 to shift from the second state $P_2$ toward the first state $P_1$. The polarized light is, therefore, modulated to have the second light component in addition to the first light component.

It is therefore to be understood that the quantity of the light transmitted from the sensing probe 120 to the photo diode 141 through the polarizer 113 is reduced with the increased ratio of the second light component to the first light component. Furthermore, this quantity of the light is increased with the increased distance between the object 160 and the sensing probe 120. This means that the object 160 can be measured, on the basis of the quantity of the light detected by the photo diode 141 of the optically analyzing means 140, by the relative position between the magneto-optic effect element 121 of the sensing probe 120 and the object 160, the shape, or the relative magnetic characteristics between the object 160 and the magneto-optic effect element 121 of the sensing probe 120.

As a consequence, the polarized light is selectively modulated to have the first and second light components by the magneto-optic effect element 121 in accordance with the presence and the absence of the applied magnetic field Ha. The applied magnetic field is modulated in accordance with the position of the object 160 with respect to the magneto-optic effect element 121, so that the polarized light can be modulated in accordance with the position of the object 160 with respect to the magneto-optic effect element 121. Each of the modulated first and second light components is, then, incident upon the polarizer 131 and analyzed to select a single light component from the first and second light components by the polarizer 131. In this case, only the first light component, which has the electric vector including the plane of polarization assuming the second state $P_2$, is allowed to pass through the polarizer 131. The analyzed and selected one of the first and second light components is, then, guided by the second optical fiber 142 and transmitted to the photo diode 141. The photo diode 141 converts the selected one of the first and second light components into the electric signal varied with the position of the object 160. Thus, the relative position between the magneto-optic effect element 121 of the sensing probe 120 and the object 160 is detected by the first embodiment of the magneto-optically modulating apparatus.

The magneto-optically modulating apparatus can be applicable to the position sensing apparatus for sensing the toothed gear 151 shown in FIG. 2. In this case, the toothed gear 151 has a plurality of teeth. When each of the teeth of the toothed gear 151 is rotated about the axis of its rotary shaft 153 to be moved to a position adjacent to the sensing probe 120, each of the teeth of the toothed gear 151 influences the magnetic field. Therefore, the position sensing apparatus can detects each of teeth of the toothed gear 151 to measure the toothed gear 151 in rotary motion by a rotational frequency, an angular velocity or an angular acceleration.

The first embodiment of the magneto-optically modulating apparatus according to the present invention has an advantage over the prior art in making it possible to modulate the light by way of the object capable of modulating the magnetic field but having no magnet attached thereto. As a result, it is possible to prevent the mechanically worn iron dust or powder produced by the mechanical apparatus including the object from being attracted to nearby mechanical parts by its own magnet. Therefore, the object, e.g., the toothed gear, has a balance of weight prevented from being lost under the influence of the magnetic field of its own magnet, when the toothed gear is rotated about the rotary shaft at a high speed.

Furthermore, the magneto-optically modulating apparatus according to the present invention can be operated to detect an eccentric displacement of the rotary shaft 153 of the toothed gear 150 eccentrically displaced from its original position for the following reason. When the rotary shaft 153 of the toothed gear 150 is eccentrically displaced from its original position, the relative position between the toothed gear 150 and the sensing probe 120 is varied, thereby causing the magnetic field in the magneto-optic effect element 121 to have the internal magnetization of the magneto-optic effect element 121 varied. At the same time, the rotational angle of the plane of polarization of the polarized light is varied. Therefore, the variation of the relative position between the toothed gear 150 and the sensing probe 120 can be detected.

Moreover, the toothed gear 150 has generally a shaft bearing (not shown). When the shaft bearing of the toothed gear 150 is worn, the rotary shaft 153 of the toothed gear 150 is displaced from its original position. The magneto-optically modulating apparatus can judge whether the shaft bearing is worn or not on the basis of the detection of the eccentric displacement of the rotary shaft 153 of the toothed gear 150.

Figure 10:
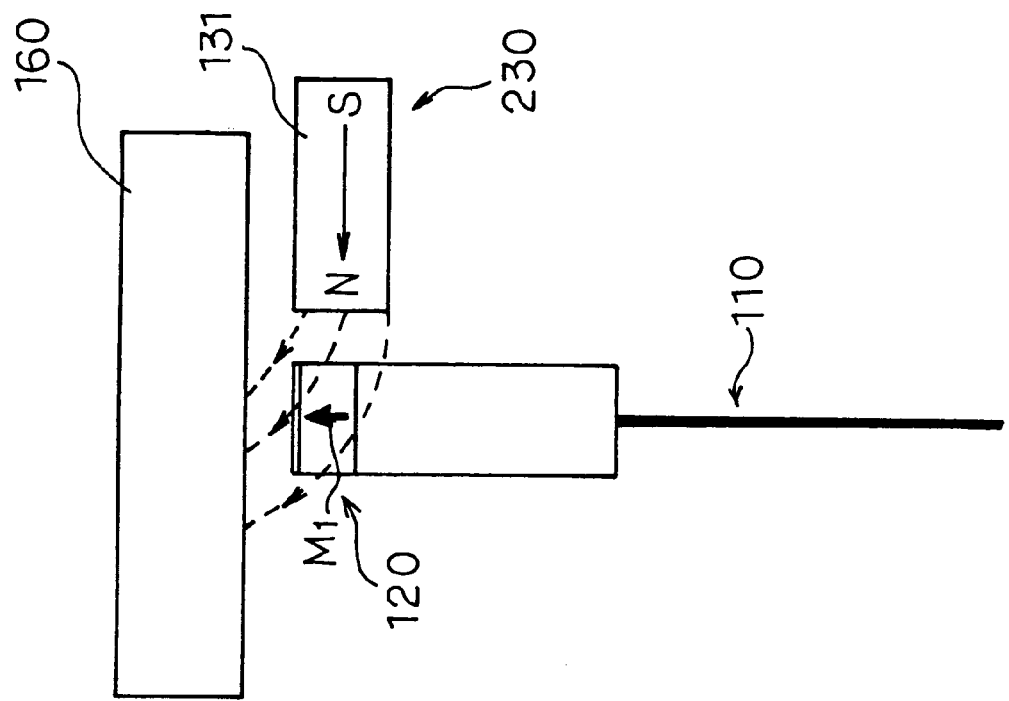
FIGS. 10 and 11 are diagrammatic illustrations of a relative relationship between the sensing probe and the object to be monitored by a second embodiment of the magneto-optically modulating apparatus according to the present invention.
Figure 11:
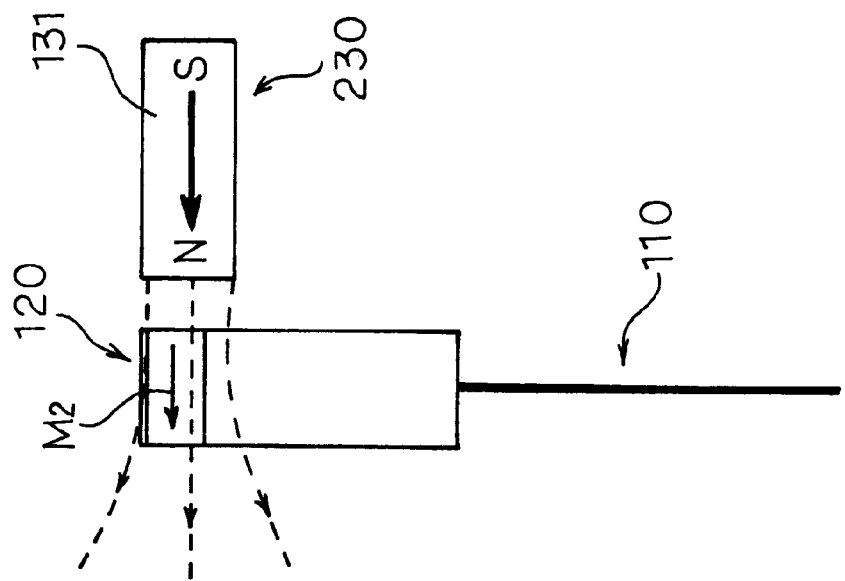

Referring to FIGS. 10 and 11 of the drawings, there are illustrated a relative relationship between the sensing probe and the object in a second preferred embodiment of the magneto-optically modulating apparatus according to the present invention.

As shown in FIGS. 10 and 11, the second embodiment of the magneto-optically modulating apparatus comprises the same constitutional elements as those of the first embodiment of the magneto-optically modulating apparatus shown in FIGS. 8 and 9 except for the fact that the magnetic field applying means 130 shown in FIGS. 8 and 9 is replaced with magnetic field applying means 230. These same constitutional elements are simply represented by the same reference numerals as those of the first embodiment, and will thus be omitted in description for avoiding tedious repetition.

The magnetic field applying means 230 is constituted by one permanent magnet 131 as shown in FIG. 10. The permanent magnet 131 is positioned on one side of the magneto-optic effect element 121 of the sensing probe 120. The magneto-optically modulating apparatus has a magnetic field around the sensing probe 120 applied by the magnet 131. The applied magnetic field has a magnetic flux represented by broken lines and having a direction perpendicular to the transmission path TP of the polarized light which passes through the magneto-optic effect element 121 of the sensing probe 120. On the other hand, as shown in FIG. 11, the magneto-optically modulating apparatus has a magnetic field around the sensing probe 120 applied by the magnet 131 and influenced by the object 160. As a result, the applied magnetic field is modulated to have the magnetic flux of the applied magnetic field oriented toward the object 160.

When the object 160 is moved to a position for away from the magneto-optic effect element 121 as shown in FIG. 10, the magnetic field is applied to the magneto-optic effect element 121 to have the internal magnetization directed to the second magnetization direction $M_2$. Therefore, the plane of polarization of the polarized light is substantially maintained at the initial state Pa to assume the second state $P_2$. The light at the second state $P_2$ is composed of the only first light component. Therefore, the polarizer 113 can transmit the light from the sensing probe 120 to the photo diode 141 therethrough.

When, on the other hand, the object 160 is moved to a position adjacent to the sensing probe 120 enough to orient the internal magnetization of the magneto-optic effect element 121 in the first magnetization direction $M_1$ substantially parallel with the transmission path TP of the polarized light as shown in FIG. 11, the rotational angle of the plane of polarization of the polarized light is increased by the magneto-optic effect element 121 to shift from the second state $P_2$ toward the first state $P_1$. The polarized light is, therefore, modulated to have the second light component in addition to the first light component.

It is therefore to be understood that the quantity of the light transmitted from the sensing probe 120 to the photo diode 141 through the polarizer 113 is reduced with the increased ratio of the second light component to the first light component. Furthermore, this quantity of the light is increased with the increased distance between the object 160 and the sensing probe 120. This means that the object 160 can be measured, on the basis of the quantity of the light detected by the photo diode 141 of the optically analyzing means 140, by the relative position between the magneto-optic effect element 121 of the sensing probe 120 and the object 160, the shape, or the relative magnetic characteristics between the object 160 and the magneto-optic effect element 121 of the sensing probe 120.

The second embodiment of the magneto-optically modulating apparatus can be reduced in size because of the fact that the magnetic field applying means 139 has only one magnet 131.

Figure 13:
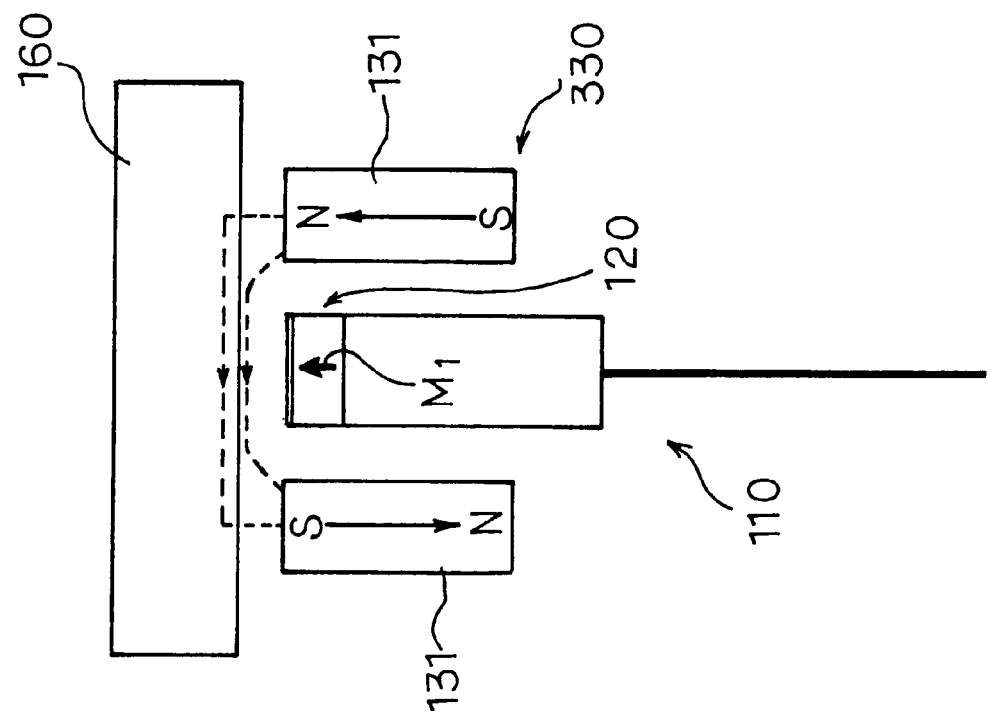
FIGS. 12 and 13 are diagrammatic illustrations of a relative relationship between the sensing probe and the object to be monitored by a third embodiment of the magneto-optically modulating apparatus according to the present invention.
Figure 12:
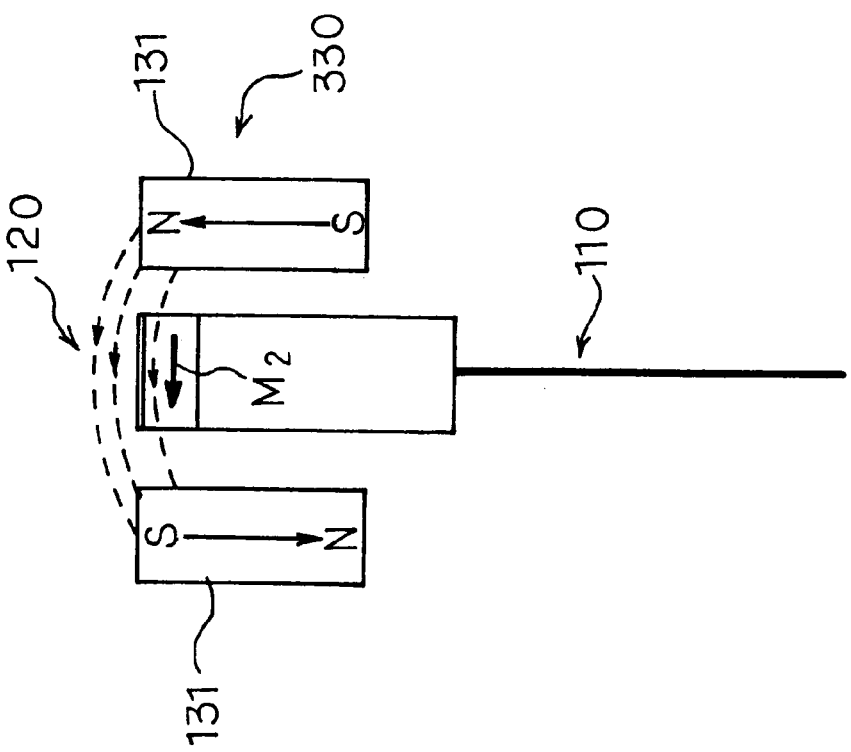

Referring to FIGS. 12 and 13 of the drawings, there are illustrated a relative relationship between the sensing probe and the object in a third preferred embodiment of the magneto-optically modulating apparatus according to the present invention.

As shown in FIGS. 12 and 13, the third embodiment of the magneto-optically modulating apparatus comprises the same constitutional elements as those of the first embodiment of the magneto-optically modulating apparatus shown in FIGS. 8 and 9 except for the fact that the magnetic field applying means 130 shown in FIGS. 8 and 9 is replaced with magnetic field applying means 330. These same constitutional elements are simply represented by the same reference numerals as those of the first embodiment, and will thus be omitted in description for avoiding tedious repetition.

The magnetic field applying means 330 is constituted by a pair of permanent magnets 131 as shown in FIG. 12. The pair of permanent magnets 131 are positioned across the magneto-optic effect element 121 of the sensing probe 120. The magneto-optically modulating apparatus has a magnetic field around the sensing probe 120 applied by the magnets 131. The applied magnetic field has a magnetic flux represented by broken lines and perpendicular to the transmission path TP of the polarized light which passes from one of the magnets 131 to the other of the magnets 131 through the magneto-optic effect element 121 of the sensing probe 120. On the other hand, as shown in FIG. 13, the magneto-optically modulating apparatus has a magnetic field around the sensing probe 120 applied by the magnet 131 and influenced by the object 160. As a result, the applied magnetic field is modulated to have the magnetic flux of the applied magnetic field passed through the object 160.

When the object 160 is moved to a position far away from the magneto-optic effect element 121 as shown in FIG. 12, the magnetic field is applied to the magneto-optic effect element 121 to have the internal magnetization directed to the second magnetization direction $M_2$. Therefore, the plane of polarization of the polarized light is substantially maintained at the initial state Pa to assume the second state $P_2$. The light at the second state $P_2$ is composed of the only first light component. Therefore, the polarizer 113 can transmit the light from the sensing probe 120 to the photo diode 141 therethrough.

When, on the other hand, the object 160 is moved to a position adjacent to the sensing probe 120 enough to orient the internal magnetization of the magneto-optic effect element 121 in the first magnetization direction $M_1$ substantially parallel with the transmission path TP of the polarized light as shown in FIG. 13, the rotational angle of the plane of polarization of the polarized light is increased by the magneto-optic effect element 121 to shift from the second state $P_2$ toward the first state $P_1$. The polarized light is, therefore, modulated to have the second light component in addition to the first light component.

It is therefore to be understood that the quantity of the light transmitted from the sensing probe 120 to the photo diode 141 through the polarizer 113 is reduced with the increased ratio of the second light component to the first light component. Furthermore, this quantity of the light is increased with the increased distance between the object 160 and the sensing probe 120. This means that the object 160 can be measured, on the basis of the quantity of the light detected by the photo diode 141 of the optically analyzing means 140, by the relative position between the magneto-optic effect element 121 of the sensing probe 120 and the object 160, the shape, or the relative magnetic characteristics between the object 160 and the magneto-optic effect element 121 of the sensing probe 120.

The third embodiment of the magneto-optically modulating apparatus can be further reduced in size.

Figure 15:
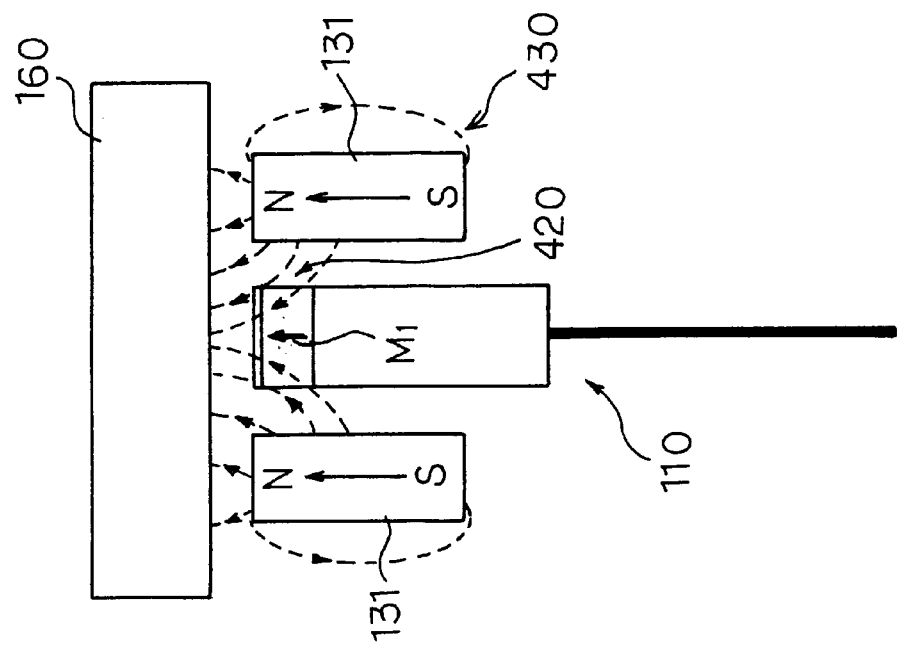
FIGS. 14 and 15 are diagrammatic illustrations of a relative relationship between the sensing probe and the object to be monitored by a fourth embodiment of the magneto-optically modulating apparatus according to the present invention.
Figure 14:
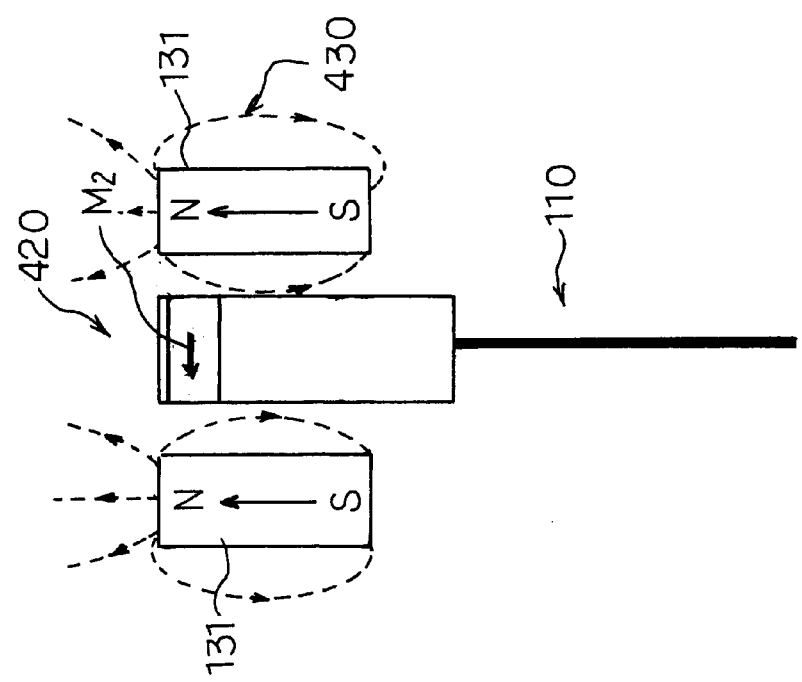

Referring to FIGS. 14 and 15 of the drawings, there are illustrated a relative relationship between the sensing probe and the object in a fourth preferred embodiment of the magneto-optically modulating apparatus according to the present invention.

As shown in FIGS. 14 and 15, the fourth embodiment of the magneto-optically modulating apparatus comprises the same constitutional elements as those of the first embodiment of the magneto-optically modulating apparatus shown in FIGS. 8 and 9 except for the fact that the sensing probe 120 and the magnetic field applying means 130 shown in FIGS. 8 and 9 are replaced with a sensing probe 420 and magnetic field applying means 430. These same constitutional elements are simply represented by the same reference numerals as those of the first embodiment, and will thus be omitted in description for avoiding tedious repetition.

In this embodiment, the sensing probe 420 is constructed in such a manner of the first embodiment except that the magneto-optic effect element 121 is placed on the transmission path TP of the polarized light with the spontaneous magnetization directions of the magneto-optic effect element being substantially perpendicular to the transmission path TP of the polarized light. The magnetic field applying means 430 is constituted by a pair of permanent magnets 131 as shown in FIG. 14. The pair of permanent magnets 131 of the magnetic field applying means 430 are positioned across the magneto-optic effect element 121 of the sensing probe 420. The magneto-optically modulating apparatus has a magnetic field around the sensing probe 420 applied by the magnets 131. The applied magnetic field has a magnetic flux as represented by broken lines in FIG. 14 to pass around the magneto-optic effect element 121 of the sensing probe 420. Therefore, the internal magnetization of the magneto-optic effect element 121 of the sensing probe 420 is oriented to have the second magnetization direction $M_2$ of the magneto-optic effect element 121 of the sensing probe 420 independently of the magnetic field applied by the magnets 131.

On the other hand, as shown in FIG. 15, the magneto-optically modulating apparatus has a magnetic field around the sensing probe 420 applied by the magnets 131 and influenced by the object 160. As a result, the applied magnetic field is modulated to have a direction to which the magnetic flux of the applied magnetic field is oriented toward the object 160, i.e., passed through the magneto-optic effect element 121 of the sensing probe 420.

When the object 160 is moved to a position far away from the magneto-optic effect element 121 of the sensing probe 420 as shown in FIG. 14, the magnetic field is applied to the magneto-optic effect element 121 of the sensing probe 420 to have the internal magnetization directed to the second magnetization direction $M_2$. Therefore, the plane of polarization of the polarized light is substantially maintained at the initial state Pa to assume the second state $P_2$. The light at the second state $P_2$ is composed of the only first light component. Therefore, the polarizer 113 can transmit the light from the sensing probe 120 to the photo diode 141 therethrough.

When, on the other hand, the object 160 is moved to a position adjacent to the sensing probe 420, as shown in FIG. 15, enough to orient the internal magnetization of the magneto-optic effect element 121 in the first magnetization direction $M_1$ substantially parallel with the transmission path TP of the polarized light as shown in FIG. 15, the rotational angle of the plane of polarization of the polarized light is increased by the magneto-optic effect element 121 to shift from the second state $P_2$ toward the first state $P_1$. The polarized light is, therefore, modulated to have the second light component in addition to the first light component.

It is therefore to be understood that the quantity of the light transmitted from the sensing probe 420 to the photo diode 141 through the polarizer 113 is reduced with the increased ratio of the second light component to the first light component when the object 160 is moved to a position adjacent to the sensing probe 420. This means that the object 160 can be measured, on the basis of the quantity of the light detected by the photo diode 141 of the optically analyzing means 140, by the relative position between the magneto-optic effect element 121 of the sensing probe 420 and the object 160, the shape, or the relative magnetic characteristics between the object 160 and the magneto-optic effect element 121 of the sensing probe 420.

The fourth embodiment of the magneto-optically modulating apparatus can modulate the light in accordance with the relative position between the magneto-optic effect element 121 of the sensing probe 420 and the object 160 by detecting the quantity of the light.

It will be explained hereinlater that the operations of the magneto-optically modulating apparatus adapted to the position sensing apparatus utilized for monitoring various objects with reference to FIGS. 16 and 17 of the drawings.

Figure 16:
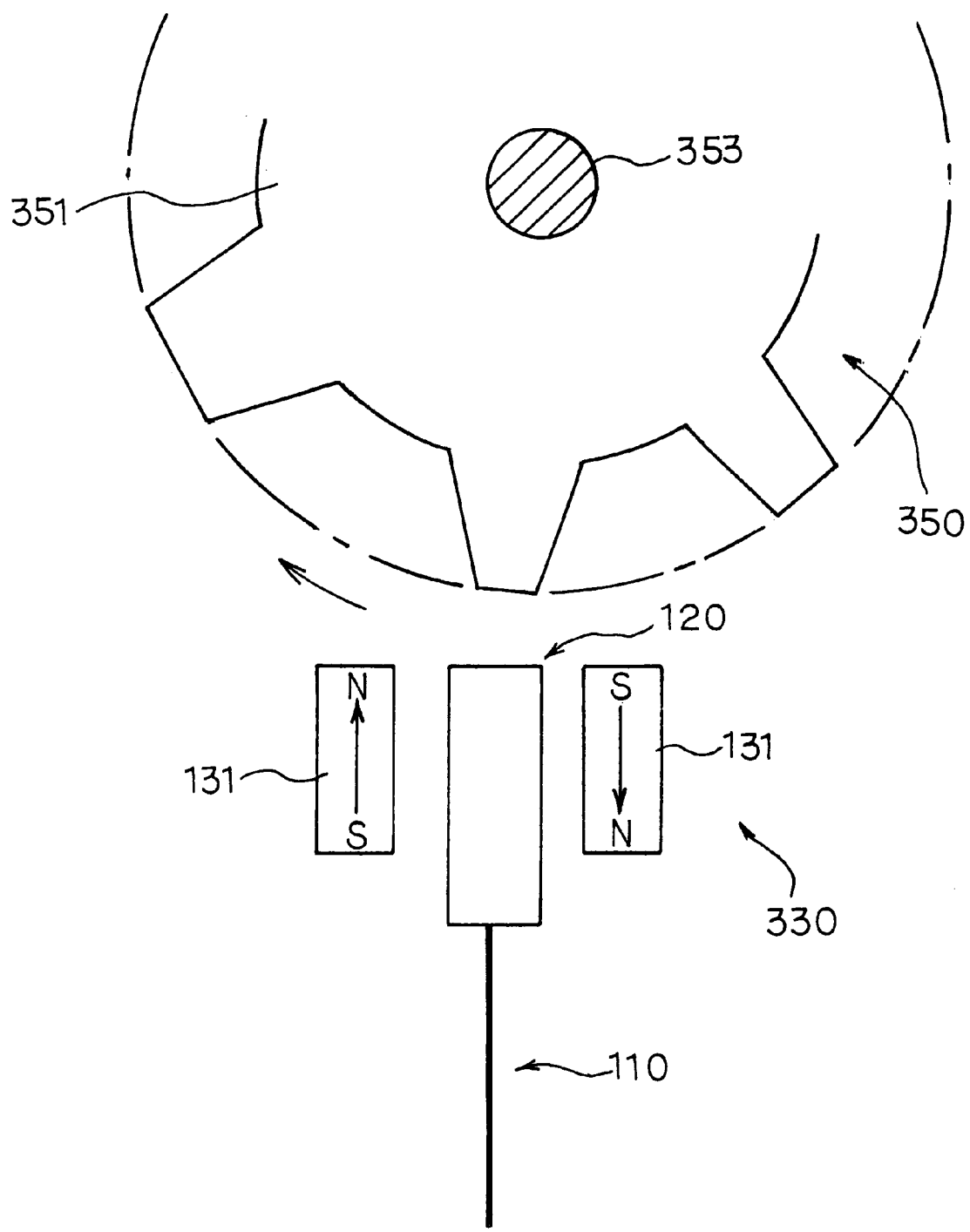
FIG. 16 is a diagrammatic illustration of the magneto-optically modulating apparatus shown in FIG. 12 and utilized to monitor the rotary toothed gear having a plurality of teeth different in shape from each other.

As shown in FIG. 16, the position sensing apparatus is constructed by the third embodiment of the magneto-optically modulating apparatus shown in FIG. 12 to be utilized for monitoring a rotary toothed gear 350 having a plurality of teeth different in shape from each other. The toothed gear 350 has a plane 351 positioned on a line extending from the transmission path TP and rotatable about the axis of its rotary shaft 353 which is substantially perpendicular to the transmission path TP.

In this embodiment, the applied magnetic field is modulated by each tooth of the toothed gear 350. The influences upon the magnetic field effected by the teeth of the toothed gear 350 are varied in accordance with the magnetic flux of the applied magnetic field passed or a passing time to pass over the sensing probe 120. This results in the fact that the position sensing apparatus can measure the toothed gear 350 by detecting the quantity of the light detected by the photo diode 141.

The toothed gear 350 is replaced with another object having a plurality of portions of magnetic substance on its peripheral portion. Each of the magnetic substance portions may be independently modulate the applied magnetic field, while another object is rotated about the axis of its rotary shaft. Therefore, the magneto-optically modulating apparatus can measure another object by a rotational frequency, an angular velocity or an angular acceleration.

The aforesaid another object further comprises a plurality of portions of nonmagnetic substance interposed between the magnetic substance portions.

Figure 17:
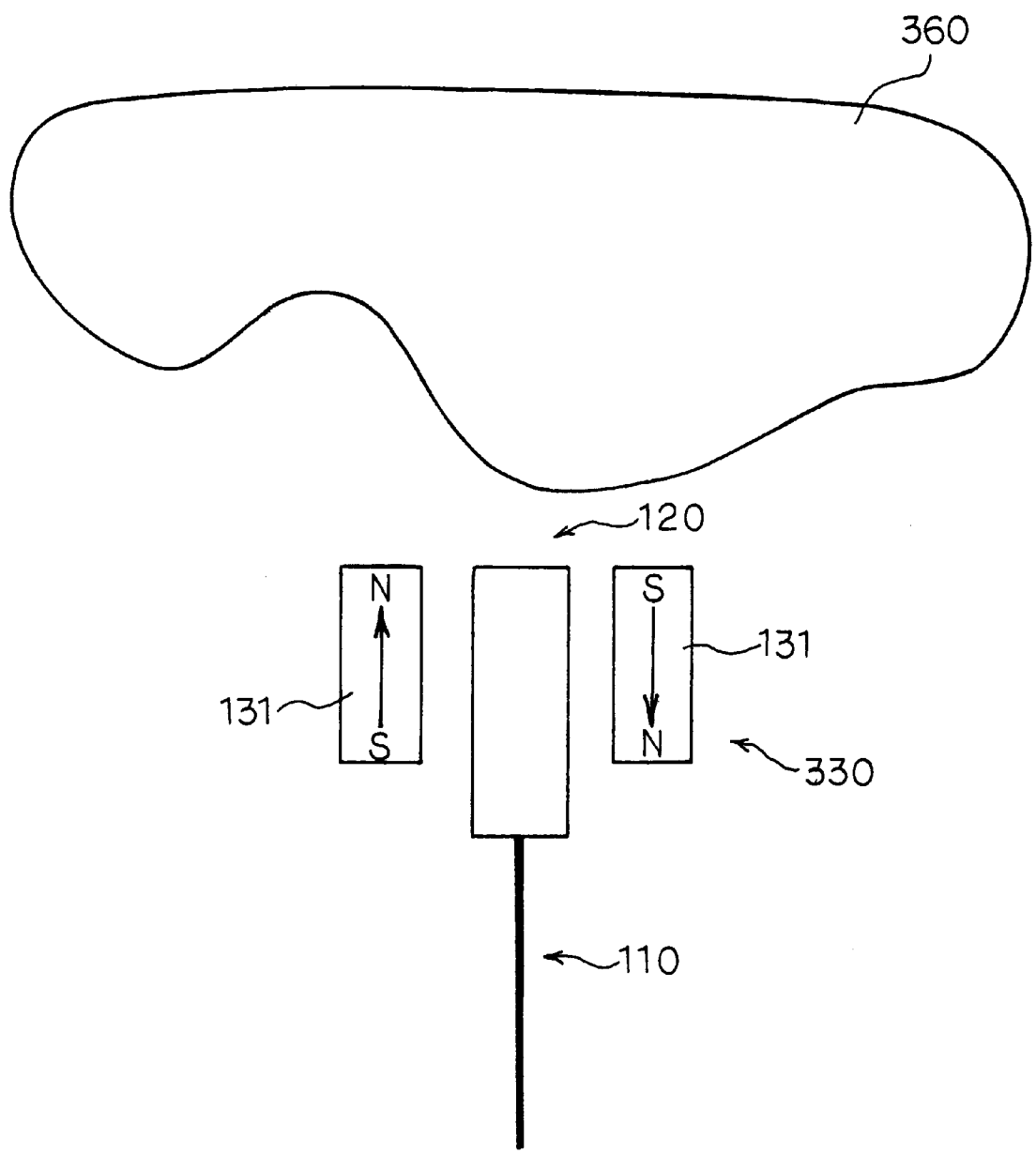
FIG. 17 is a diagrammatic illustration of the magneto-optically modulating apparatus shown in FIG. 12 and utilized to monitor the object having a curved peripheral surface portion.

The aforesaid toothed gear 350 may be replaced with another object 360 having a curved peripheral surface portion as shown in FIG. 17. In this case, the magneto-optically modulating apparatus can measure the object 360 by the relative position between the sensing probe 120 and the object 360, the shape, the relative magnetic characteristics between the sensing probe 120 and the object 360 or the movement while the object 360 is moved in a straight-line motion along a line substantially perpendicular to the transmission path TP.

Figure 18:
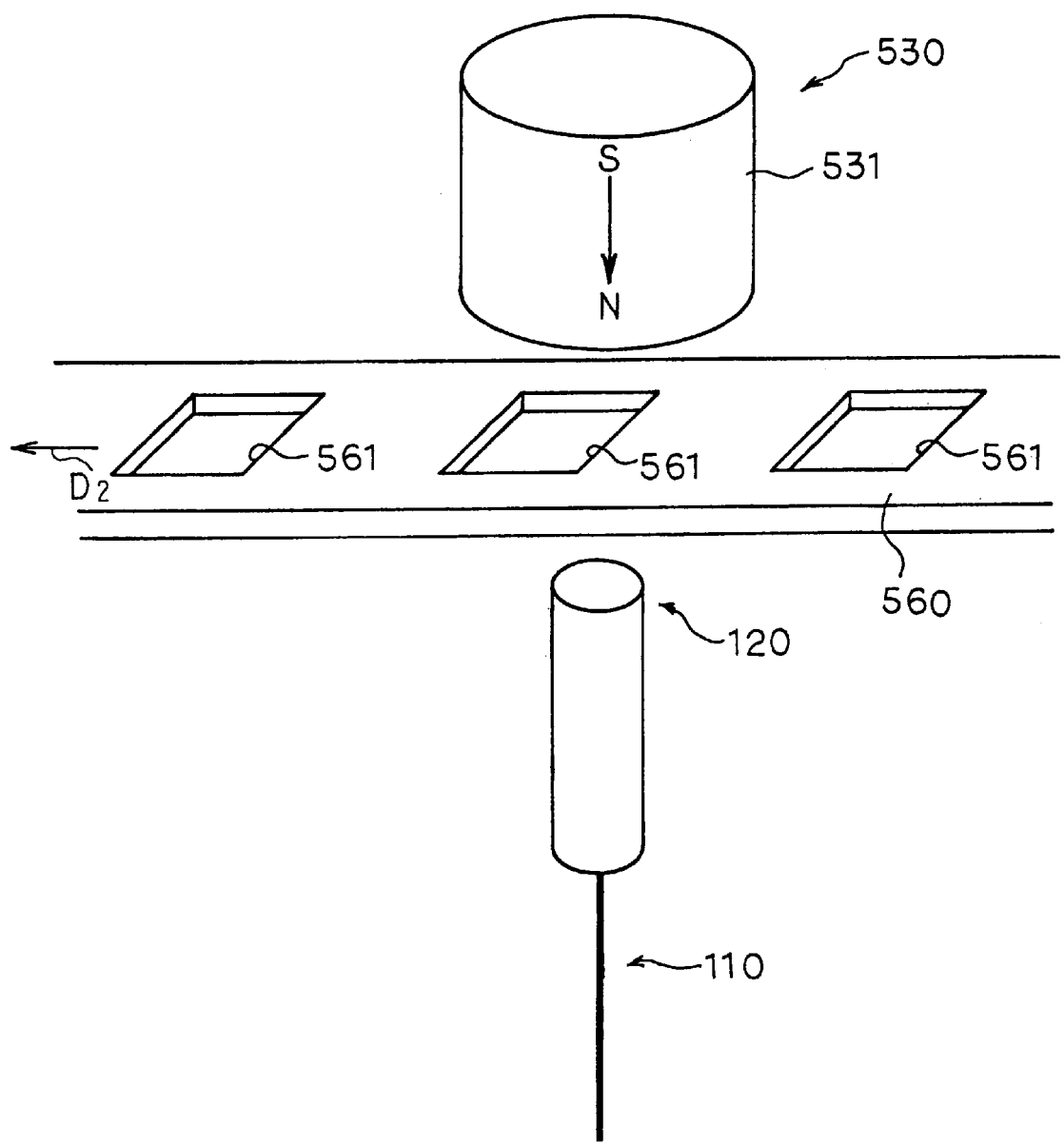
FIG. 18 is a perspective view of a fifth embodiment of the magneto-optically modulating apparatus according to the present invention for monitoring the object having a plurality of holes.

Referring to FIG. 18 of the drawings, there is shown a fifth embodiment of the magneto-optically modulating apparatus according to the present invention. As shown in FIG. 18, the fifth embodiment of the magneto-optically modulating apparatus comprises the same constitutional elements as those of the first embodiment of the magneto-optically modulating apparatus shown in FIGS. 8 and 9 except for the fact that the magnetic field applying means 130 shown in FIGS. 8 and 9 is replaced with magnetic field applying means 530. These same constitutional elements are simply represented by the same reference numerals as those of the first embodiment, and will thus be omitted in description for avoiding tedious repetition.

The magnetic field applying means 530 is constituted by a permanent magnet 531 as shown in FIG. 18. The permanent magnet 531 is removable to outside of the magneto-optically modulating apparatus. In this embodiment, the magneto-optically modulating apparatus is operated to monitor an object 560 having a plane surface and a plurality of holes 561 serially arranged on the plane surface and spaced apart from each other. The object 560 is interposed between the sensing probe 120 and the permanent magnet 531 to have its plane faced in perpendicular to the transmission path TP of the polarized light passed through the sensing probe 120. The object 560 is moved into a direction $D_2$ shown in FIG. 18.

When the object 560 is moved, the applied magnetic field is modulated in accordance with the presence or absence of the plurality of holes 561 of the object 560. Therefore, the magneto-optically modulating apparatus can measure the object 560 by the movement, the shape, or the relative magnetic characteristics between the object 560 and the sensing probe 120.

The object 560 may have a curved surface movable with respect to the sensing probe 120. The object 560 may have a plurality of magnetic portions arranged on the plane surface and spaced apart from each other.

Figure 19:
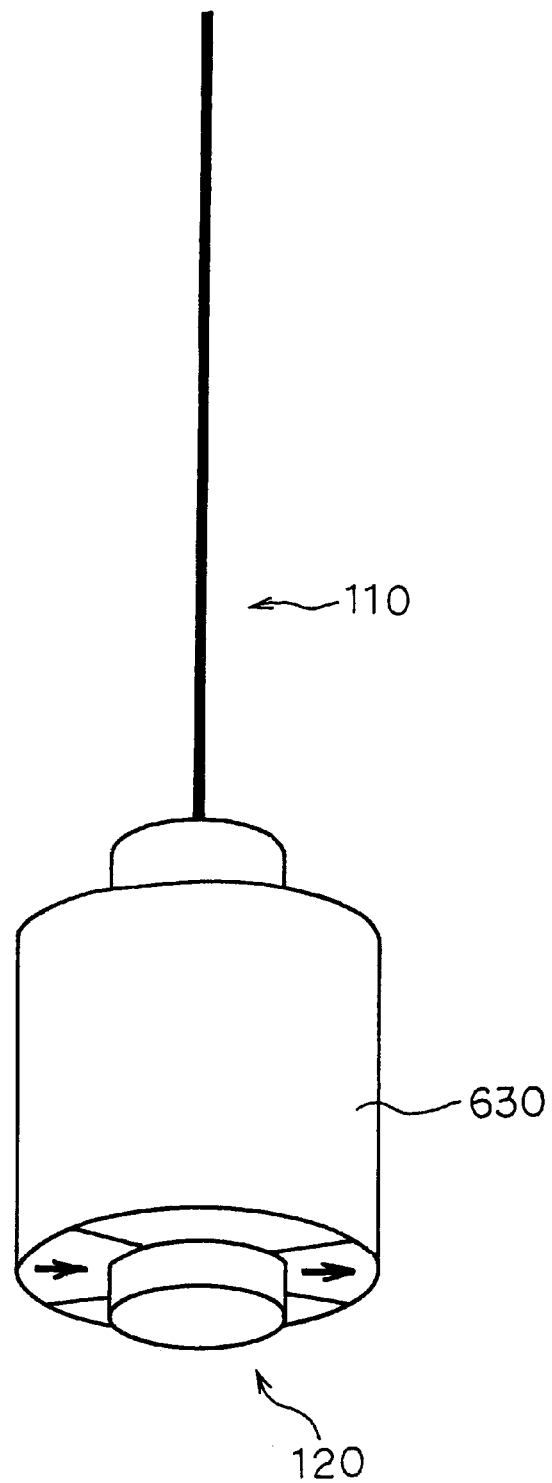
FIG. 19 is a perspective view showing a sixth embodiment of the magneto-optically modulating apparatus according to the present invention.

There is shown a sixth embodiment of the magneto-optically modulating apparatus according to the present invention with reference to FIG. 19 of the drawings. As shown in FIG. 19, the sixth embodiment of the magneto-optically modulating apparatus comprises the same constitutional elements as those of the first embodiment of the magneto-optically modulating apparatus shown in FIGS. 8 and 9 except for the fact that the magnetic field applying means 130 shown in FIGS. 8 and 9 is replaced with magnetic field applying means 630. These same constitutional elements are simply represented by the same reference numerals as those of the first embodiment, and will thus be omitted in description for avoiding tedious repetition.

The magnetic field applying means 630 is constituted by a hollow cylindrical magnet and encircled around the sensing probe 120 as shown in FIG. 19.

Figure 20:
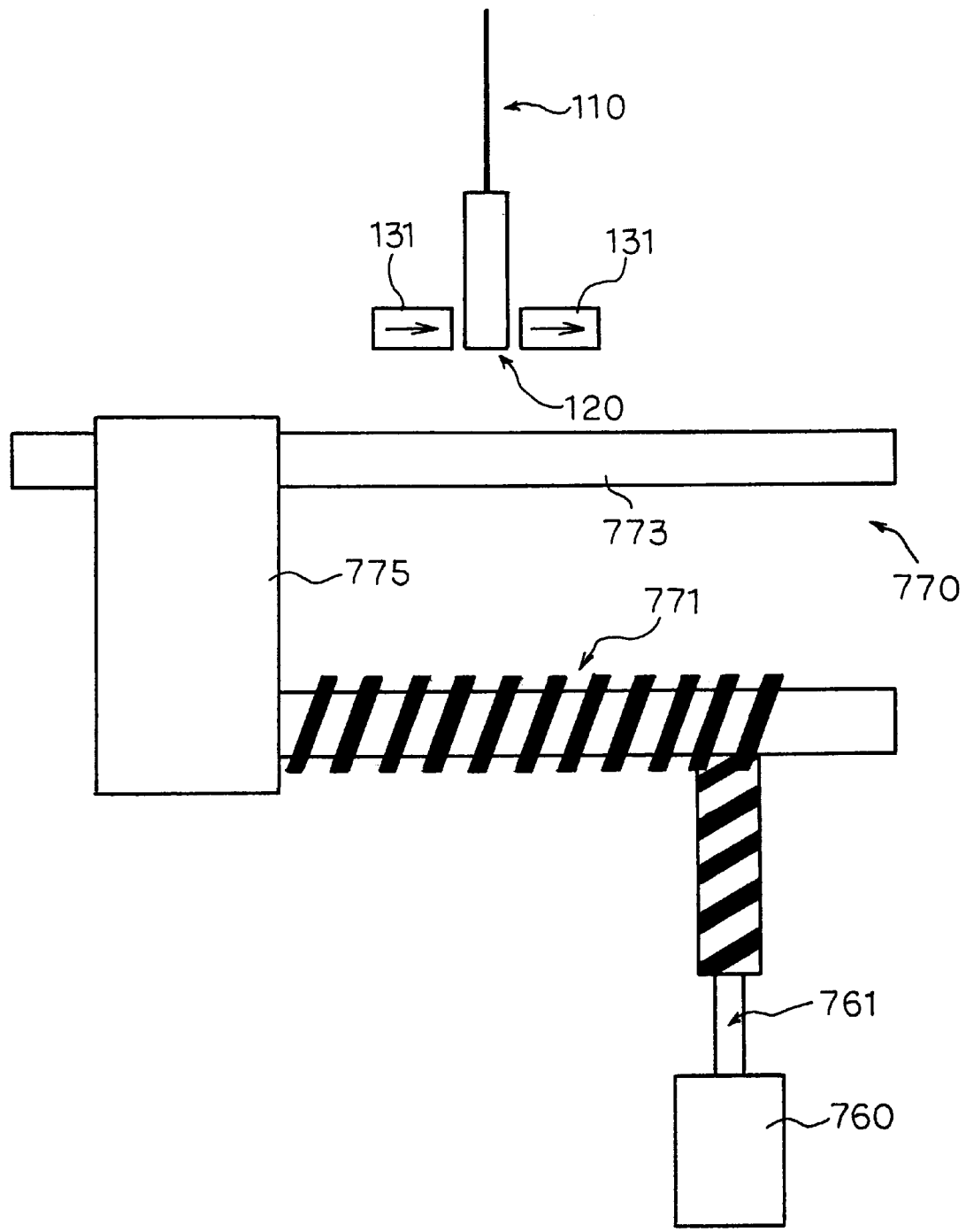
FIG. 20 is a schematic view showing a seventh embodiment of the magneto-optically modulating apparatus according to the present invention.
Figure 21:
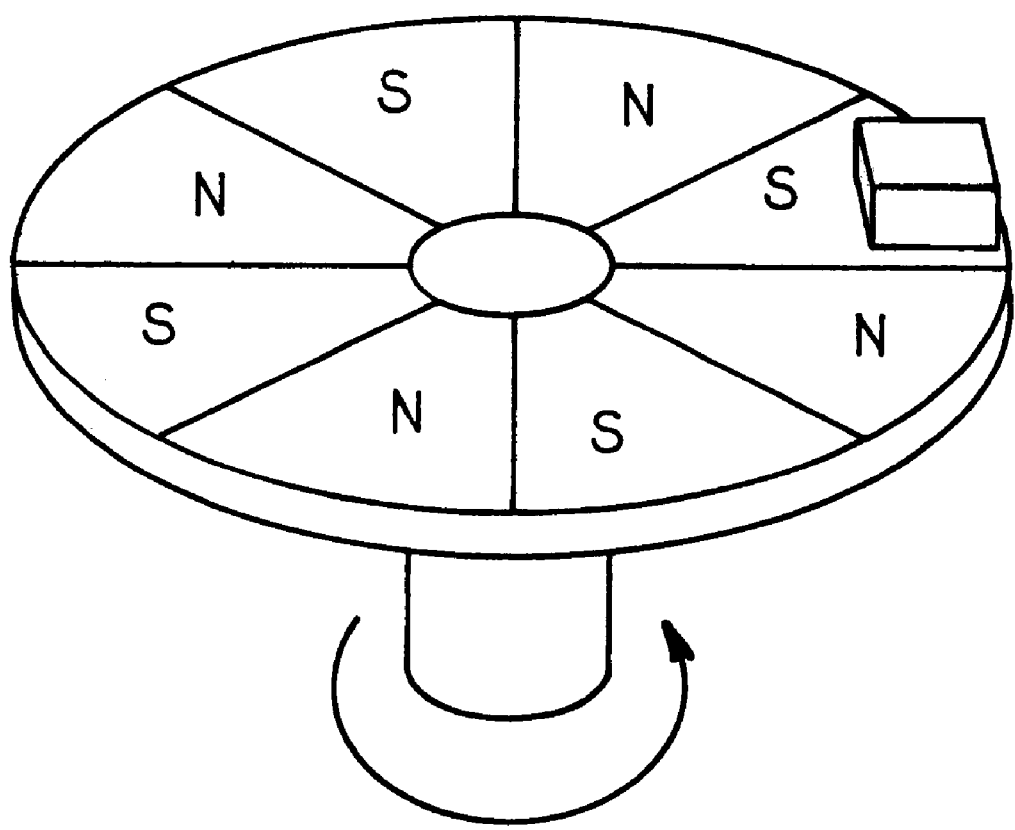
FIG. 21 is a perspective view showing a conventional position sensing apparatus utilizing a Hall effect element.
Figure 22:
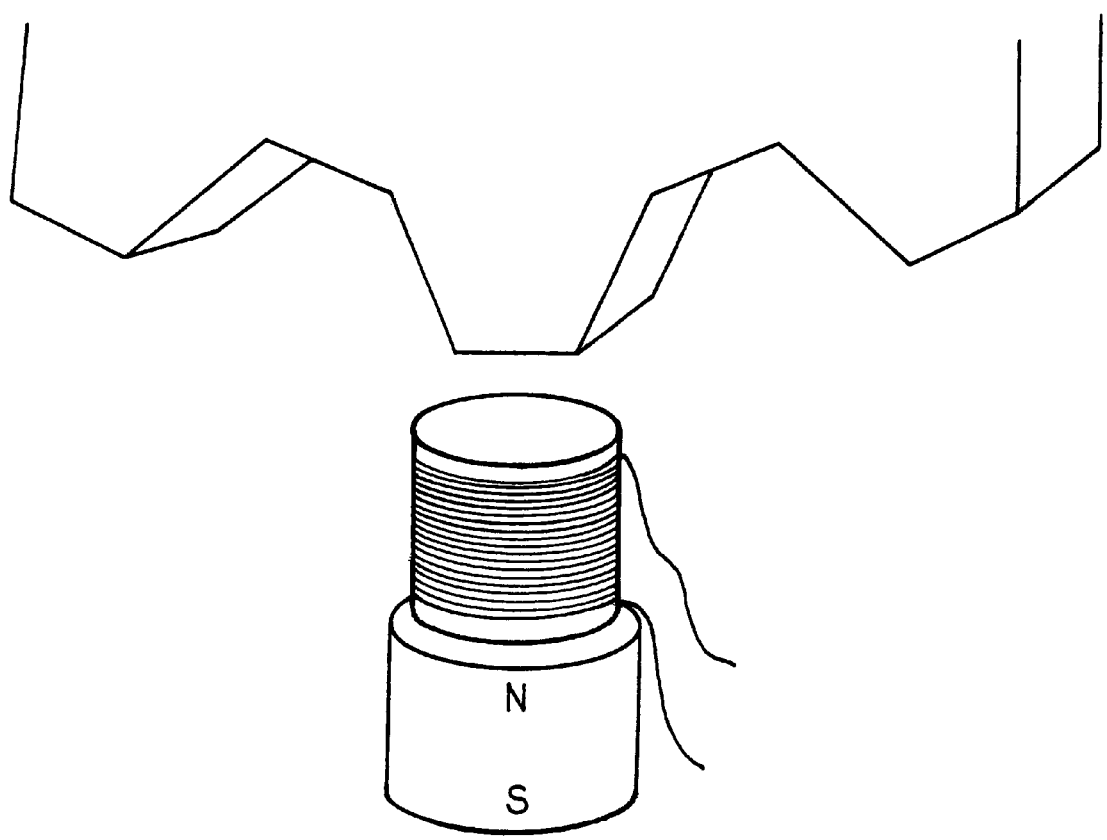
FIG. 22 is a perspective view showing a conventional position sensing apparatus utilizing an inductive coil type element.

There is shown a seventh embodiment of the magneto-optically modulating apparatus according to the present invention with reference to FIG. 20 of the drawings. As shown in FIG. 20, the seventh embodiment of the magneto-optically modulating apparatus is identical with the first embodiment of the magneto-optically modulating apparatus.

The magneto-optically modulating apparatus shown in FIG. 20 is utilized as a position sensing apparatus to measure a rotary object, such as a motor 760, by a rotational frequency, an angular velocity or an angular acceleration when the motor 760 is rotated about the axis of its rotary shaft 761. The magneto-optically modulating apparatus comprises motion converting means 770 for converting the rotary motion of the object into a rectilinear motion. The motion converting means 770 having a screw 771 secured at one end to the rotary shaft 761 of the motor 760 to transmit the rotational movement from one end to the other end, a rail 773 and a movable stage 775 attached at one end on the other end of the screw 771 and slidably connected at the other end to the rail 773.

The movable stage 775 has a magnetic portion capable of modulating the magnetic field of the magneto-optic effect element faced to and moved with respect to the magneto-optic effect element 121 of the sensing probe 120. The analyzing means 140 is operated to detect the rectilinear motion of the magnetic portion of the motion converting means 770 to analyze the rotary motion of the motor 760.

The many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described herein, and accordingly, all suitable modifications and equivalents may be construed as being encompassed within the scope of the invention.

What is claimed is:

1. A method of magneto-optically modulating light by way of an object capable of modulating a magnetic field, comprising the steps of:

(a) producing a linearly-polarized light having a plane of polarization and a transmission path having said polarized light travel thereon;

(b) preparing a magneto-optic effect element made of a magnetic substance having an internal magnetization with a predetermined spontaneous magnetization direction, said magneto-optic effect element being placed on said transmission path of said polarized light with the spontaneous magnetization direction of said magneto-optic effect element being substantially parallel with said transmission path of said polarized light, said internal magnetization of said magneto-optic effect element being oriented between two different magnetization directions consisting of a first magnetization direction in which said internal magnetization of said magneto-optic effect element is substantially parallel with said transmission path of said polarized light, and a second magnetization direction in which said internal magnetization of said magneto-optic effect element is substantially perpendicular to said transmission path of said polarized light, said internal magnetization of said magneto-optic effect element having said plane of polarization of said polarized light rotatable between two different states consisting of a first state in which said plane of polarization of said polarized light is rotated about said transmission path of said polarized light when said internal magnetization of said magneto-optic effect element is oriented to said first magnetization direction, and a second state in which said plane of polarization of said polarized light is maintained when said internal magnetization of said magneto-optic effect element is oriented to said second magnetization direction;

(c) applying a magnetic field to said magneto-optic effect element to have said internal magnetization of said magneto-optic effect element oriented to said second magnetization direction to have said plane of polarization of said polarized light substantially maintained in said second state;

(d) varying said magnetic field in accordance with a relative relationship between said object and said magneto-optic effect element to have said internal magnetization of said magneto-optic effect element varied between said first magnetization direction and said second magnetization direction to have said plane of polarization of said polarized light rotated about said transmission path between said first state and second state when said polarized light passes through said magneto-optic effect element.

2. The method as set forth in claim 1, in which said relative relationship includes a relative position between said object and said magneto-optic effect element.

3. The method as set forth in claim 1, in which said relative relationship includes relative magnetic characteristics between said object and said magneto-optic effect element.

4. The method as set forth in claim 1, in which said magnetic substance of said magneto-optic effect element includes a ferromagnetic substance.

5. The method as set forth in claim 4, in which said ferromagnetic substance forming magneto-optic effect element includes a ferrimagnetic substance.

6. A method of magneto-optically modulating light by way of an object capable of modulating a magnetic field, comprising the steps of:

(a) producing a linearly-polarized light having a plane of polarization and a transmission path having said polarized light travel thereon;

(b) preparing a magneto-optic effect element made of a magnetic substance having an internal magnetization with a predetermined spontaneous magnetization direction, said magneto-optic effect element being placed on said transmission path of said polarized light with the spontaneous magnetization direction of said magneto-optic effect element being substantially perpendicular to said transmission path of said polarized light, said internal magnetization of said magneto-optic effect element being oriented between two different magnetization directions consisting of a first magnetization direction in which said internal magnetization of said magneto-optic effect element is substantially parallel with said transmission path of said polarized light, and a second magnetization direction in which said internal magnetization of said magneto-optic effect element is substantially perpendicular to said transmission path of said polarized light, said internal magnetization of said magneto-optic effect element having said plane of polarization of said polarized light rotatable between two different states consisting of a first state in which said plane of polarization of said polarized light is rotated about said transmission path of said polarized light when said internal magnetization of said magneto-optic effect element is oriented to said first magnetization direction, and a second state in which said plane of polarization of said polarized light is maintained when said internal magnetization of said magneto-optic effect element is oriented to said second magnetization direction;

(c) applying a magnetic field to said magneto-optic effect element to have said internal magnetization of said magneto-optic effect element oriented to said first magnetization direction to have said plane of polarization of said polarized light rotated about said transmission path to assume said first state; and (d) varying said magnetic field in accordance with a relative relationship between said object and said magneto-optic effect element to have said internal magnetization of said magneto-optic effect element varied between said first magnetization direction and said second magnetization direction to have said plane of polarization of said polarized light rotated about said transmission path between said first state and second state when said polarized light passes through said magneto-optic effect element.

7. The method as set forth in claim 6, in which said relative relationship includes a relative position between said object and said magneto-optic effect element.

8. The method as set forth in claim 6, in which said relative relationship includes relative magnetic characteristics between said object and said magneto-optic effect element.

9. The method as set forth in claim 6, in which said magnetic substance of said magneto-optic effect element includes a ferromagnetic substance.

10. The method as set forth in claim 9, in which said ferromagnetic substance forming magneto-optic effect element includes a ferrimagnetic substance.

11. A position sensing apparatus utilizing magneto-optic modulation for monitoring an object capable of modulating a magnetic field, comprising:

linearly-polarized light producing means for producing a linearly-polarized light having a plane of polarization and a transmission path having said polarized light travel thereon;

a magneto-optic effect element made of a magnetic substance having an internal magnetization with a predetermined spontaneous magnetization direction, said magneto-optic effect element being placed on said transmission path of said polarized light, said internal magnetization of said magneto-optic effect element being oriented between two different magnetization directions consisting of a first magnetization direction in which said internal magnetization of said magneto-optic effect element is substantially parallel with said transmission path of said polarized light, and a second magnetization direction in which said internal magnetization of said magneto-optic effect element is substantially perpendicular to said transmission path of said polarized light, said internal magnetization of said magneto-optic effect element having said plane of polarization of said polarized light rotatable between two different states consisting of a first state in which said plane of polarization of said polarized light is rotated about said transmission path of said polarized light at a predetermined rotational angle when said internal magnetization of said magneto-optic effect element is oriented to said first magnetization direction, and a second state in which said plane of polarization of said polarized light is maintained when said internal magnetization of said magneto-optic effect element is oriented to said second magnetization direction;

magnetic field applying means for applying a magnetic field to said magneto-optic effect element; and analyzing means for analyzing said polarized light after passing through said magneto-optic effect element to detect a relative relationship between said object and said magneto-optic effect element.

12. The position sensing apparatus as set forth in claim 11, in which said magneto-optic effect element is placed on said transmission path of said polarized light with the spontaneous magnetization direction of said magneto-optic effect element being substantially parallel with said transmission path of said polarized light, and said magnetic applying means applying said magnetic field to said magneto-optic effect element to have said internal magnetization of said magneto-optic effect element oriented to said second magnetization direction to have said plane of polarization of said polarized light in said first state.

13. The position sensing apparatus as set forth in claim 11, in which said magneto-optic effect element is placed on said transmission path of said polarized light with the spontaneous magnetization direction of said magneto-optic effect element being substantially perpendicular to said transmission path of said polarized light, and said magnetic applying means applying said magnetic field to said magneto-optic effect element to have said internal magnetization of said magneto-optic effect element oriented to said first magnetization direction to have said plane of polarization of said polarized light rotated about said transmission path at said rotational angle in said first state.

14. The position sensing apparatus as set forth in claim 11, in which said relative relationship includes a relative position between said object and said magneto-optic effect element.

15. The position sensing apparatus as set forth in claim 11, in which said relative relationship includes relative magnetic characteristics between said object and said magneto-optic effect element.

16. The position sensing apparatus as set forth in claim 11, in which said magnetic substance of said magneto-optic effect element includes a ferromagnetic substance.

17. The position sensing apparatus as set forth in claim 16, in which said ferromagnetic substance forming magneto-optic effect element includes a ferrimagnetic substance.

18. The position sensing apparatus as set forth in claim 11, in which said magnetic field applying means is constituted by a magnetic generator for applying a magnetic field directed to a predetermined direction, said directions of said magnetic fields of said magnetic generator being substantially parallel and identical with each other and substantially perpendicular to said transmission path of said polarized light.

19. The position sensing apparatus as set forth in claim 11, in which said magnetic field applying means is constituted by at least two magnetic generators positioned across said magneto-optic effect element and applying a magnetic field directed to a predetermined direction, said directions of said magnetic field of said magnetic generators being substantially parallel and identical with each other and substantially perpendicular to said transmission path of said polarized light.

20. The position sensing apparatus as set forth in claim 19, in which each of said magnetic generators has a direction of magnetization, said directions of magnetization of said magnetic generators being substantially perpendicular to each other and identical to each other.

21. The position sensing apparatus as set forth in claim 19, in which each of said magnetic generators has a direction of magnetization, said directions of magnetization of said magnetic generators being substantially parallel with each other and identical to each other.

22. The position sensing apparatus as set forth in claim 19, in which each of said magnetic generators has a direction of magnetization, said directions of magnetization of said magnetic generators being substantially perpendicular to each other and opposite to each other.

23. The position sensing apparatus as set forth in claim 11, in which said object is placed on a line extended from said transmission path of the polarized light and spaced apart from said magneto-optic effect element at a predetermined distance to modulate said magnetic field applied by said magnetic field applying means.

24. The position sensing apparatus as set forth in claim 11, in which said object has a plane board and a rotary shaft about which said plane board of said object is rotated, said rotary shaft substantially perpendicular to said transmission path of the polarized light, and having a plurality of magnetic portions on its peripheral portion, said analyzing means detecting the rotation of said object on the basis of said applied magnetic field varied in response to the rotation of said object when said object is rotated about said rotary shaft.

25. The position sensing apparatus as set forth in claim 24, in which said rotation of said object is analyzed by said analyzing means to obtain a rotational frequency, an angular velocity, or an angular acceleration.

26. The position sensing apparatus as set forth in claim 24, in which said analyzing means is operable to detect an eccentric displacement of said rotary shaft of said object eccentrically displaced from its original position.

27. The position sensing apparatus as set forth in claim 26, in which said object has a shaft bearing, said analyzing means operable to judge whether said shaft bearing is worn or not on the basis of the detected eccentric displacement of said rotary shaft of said object.

28. The position sensing apparatus as set forth in claim 11, in which said object has a plane board and a rotary shaft about which said plane board of said object is rotated, said plane board having a curved surface portion on its peripheral portion, said rotary shaft substantially perpendicular to said transmission path of the polarized light, said analyzing means detecting the rotation of said object on the basis of said applied magnetic field varied in response to the rotation of said object when said object is rotated about said rotary shaft.

29. The position sensing apparatus as set forth in claim 28, in which said rotation of said object is analyzed by said analyzing means to obtain a rotational frequency, an angular velocity, or an angular acceleration.

30. The position sensing apparatus as set forth in claim 28, in which said analyzing means is operable to detect an eccentric displacement of said rotary shaft of said object eccentrically displaced from its original position.

31. The position sensing apparatus as set forth in claim 28, in which said object has a shaft bearing, said analyzing means operable to judge whether said shaft bearing is worn or not on the basis of the detected eccentric displacement of said rotary shaft of said object.

32. The position sensing apparatus as set forth in claim 11, further comprising motion converting means for converting the rotary motion of said object into a rectilinear motion, said motion converting means having a magnetic portion capable of modulating said magnetic field of said magneto-optic effect element faced to and moved with respect to said magneto-optic effect element, said analyzing means detecting the rectilinear motion of said magnetic portion of said motion converting means to analyze said rotary motion of said object.

33. The position sensing apparatus as set forth in claim 11, in which said object has a curved surface portion faced to said magneto-optic effect element and movable along a line perpendicular to said transmission path of said polarized light, said analyzing means analyzing said movement of said object.

34. The position sensing apparatus as set forth in claim 11, in which said object has at least one magnetic portion capable of modulating said magnetic field of said magneto-optic effect element and moved with respect to said magneto-optic effect element, said analyzing means analyzing said movement of said object.

35. The position sensing apparatus as set forth in claim 11, in which said object has a surface faced to said magneto-optic effect element and movable with respect to said magneto-optic effect element and a plurality of magnetic portions arranged on said surface and spaced apart from each other.

36. The position sensing apparatus as set forth in claim 35, in which said surface has a curved surface.

37. The position sensing apparatus as set forth in claim 35, in which said surface has a flat surface.

38. The position sensing apparatus as set forth in claim 11, in which said linearly-polarized light producing means is constituted by a light source for emitting a light having a plurality of said planes of polarization and a polarizer for linearly polarizing said light emitted from said light source to produce a linearly-polarized light having a plane of polarization of said light polarized into said first state, and said apparatus further comprising:

a first optical wave guiding means for guiding the light emitted from said light source on said transmission path of said light and transmitting said polarized light from said light source to said magneto-optic effect element through said polarizer;

reflecting means for reflecting the light which penetrates through said magneto-optic effect element to have said polarized light travel in the opposite direction on said transmission path through said magneto-optic effect element; and a second optical wave guiding means for guiding the light reflected by said reflecting means from said magneto-optic effect element to said analyzing means through said polarizer.

39. The position sensing apparatus as set forth in claim 38, in which said rotational angle of said plane of polarization of said polarized light is 45 degrees when said polarized light passes through said magneto-optic effect element and said internal magnetization of said magneto-optic effect element is directed to said first magnetization direction.

* * * * *